(12) United States Patent
Beeson

(10) Patent No.: US 7,593,527 B2
(45) Date of Patent: Sep. 22, 2009

(54) PROVIDING DIGITAL SIGNATURE AND PUBLIC KEY BASED ON SHARED KNOWLEDGE

(75) Inventor: Curtis Linn Beeson, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 792 days.

(21) Appl. No.: 11/161,556

(22) Filed: Aug. 8, 2005

(65) Prior Publication Data

US 2006/0153365 A1 Jul. 13, 2006

Related U.S. Application Data

(60) Provisional application No. 60/641,957, filed on Jan. 7, 2005, provisional application No. 60/641,958, filed on Jan. 7, 2005.

(51) Int. Cl.
*H04L 9/00* (2006.01)
*H04L 9/30* (2006.01)
*H04L 9/32* (2006.01)

(52) U.S. Cl. ............................ 380/30; 380/28; 713/170; 713/176; 713/180

(58) Field of Classification Search ........................ None
See application file for complete search history.

(56) References Cited

U.S. PATENT DOCUMENTS

| | | | |
|---|---|---|---|
| 3,962,539 | A | 6/1976 | Ehrsam et al. |
| 4,200,770 | A | 4/1980 | Hellman et al. |
| 4,218,582 | A | 8/1980 | Hellman et al. |
| 4,405,829 | A | 9/1983 | Rivest et al. |
| 4,408,203 | A | 10/1983 | Campbell |
| 4,424,414 | A | 1/1984 | Hellman et al. |
| 4,748,668 | A | 5/1988 | Shamir et al. |
| 4,797,920 | A | 1/1989 | Stein |
| 4,823,388 | A | 4/1989 | Muizutani et al. |

(Continued)

FOREIGN PATENT DOCUMENTS

CA  2271178  5/1999

(Continued)

OTHER PUBLICATIONS

PKCS #9, Selected Object Classes and Attribute Types Version 2.0, RSA Laboratories, Redwood City, CA, pp. 1-42, Nov. 1, 2000.

(Continued)

*Primary Examiner*—Kaveh Abrishamkar
(74) *Attorney, Agent, or Firm*—Sutherland Asbill & Brennan LLP

(57) ABSTRACT

A public key and digital signature is provided using a private key of a public-private key pair in an elliptic curve digital signature algorithm (ECDSA) by: identifying domain parameters of an elliptic curve for use in elliptic curve cryptography, the domain parameters including an initial generating point; transforming the generating point into a new generating point as a deterministic function; generating the public key as a deterministic function of the private key and the domain parameters, in which the new generating point is substituted for the initial generating point; and generating the digital signature as a function of the private key and the domain parameters, in which the new generating point is substituted for the initial generating point.

28 Claims, 20 Drawing Sheets

U.S. PATENT DOCUMENTS

| | | | |
|---|---|---|---|
| 4,825,050 A | 4/1989 | Griffith et al. | |
| 4,850,017 A | 7/1989 | Matyas, Jr. et al. | |
| 4,868,877 A | 9/1989 | Fischer | |
| 5,001,752 A | 3/1991 | Fischer | |
| 5,018,196 A | 5/1991 | Takaragi | |
| 5,029,208 A | 7/1991 | Tanaka | |
| 5,140,634 A | 8/1992 | Guillou et al. | |
| 5,231,668 A | 7/1993 | Kravitz | |
| 5,422,953 A | 6/1995 | Fischer | |
| 5,455,865 A | 10/1995 | Perlman | |
| 5,502,766 A | 3/1996 | Boebert et al. | |
| 5,539,828 A | 7/1996 | Davis | |
| 5,563,946 A | 10/1996 | Cooper et al. | |
| 5,604,801 A | 2/1997 | Dolan et al. | |
| 5,615,266 A | 3/1997 | Altschuler | |
| 5,615,268 A | 3/1997 | Bisbee et al. | |
| 5,623,637 A | 4/1997 | Jones et al. | |
| 5,636,280 A | 6/1997 | Kelly | |
| 5,659,616 A | 8/1997 | Sudia | |
| 5,671,279 A | 9/1997 | Elgamal | |
| 5,671,285 A | 9/1997 | Newman | |
| 5,677,953 A | 10/1997 | Dolphin | |
| 5,694,471 A | 12/1997 | Chen et al. | |
| 5,721,779 A | 2/1998 | Funk | |
| 5,751,813 A | 5/1998 | Dorenbos | |
| 5,778,072 A | 7/1998 | Samar | |
| 5,787,172 A | 7/1998 | Arnold | |
| 5,790,677 A | 8/1998 | Fox et al. | |
| 5,796,840 A | 8/1998 | Davis | |
| 5,809,144 A | 9/1998 | Sirbu et al. | |
| 5,812,666 A | 9/1998 | Baker et al. | |
| 5,825,884 A | 10/1998 | Zdepski et al. | |
| 5,848,161 A | 12/1998 | Luneau et al. | |
| 5,870,475 A | 2/1999 | Allan et al. | |
| 5,878,142 A | 3/1999 | Caputo et al. | |
| 5,883,810 A | 3/1999 | Franklin et al. | |
| 5,887,131 A | 3/1999 | Angelo | |
| 5,910,989 A | 6/1999 | Naccache | |
| 5,943,423 A | 8/1999 | Muftic | |
| 5,949,881 A | 9/1999 | Davis | |
| 5,956,404 A | 9/1999 | Schneier | |
| 5,963,648 A | 10/1999 | Rosen | |
| 5,970,147 A | 10/1999 | Davis | |
| 6,009,177 A | 12/1999 | Sudia | |
| 6,021,202 A | 2/2000 | Anderson | |
| 6,023,509 A | 2/2000 | Herbert et al. | |
| 6,044,154 A | 3/2000 | Kelly | |
| 6,061,794 A | 5/2000 | Angelo et al. | |
| 6,061,799 A | 5/2000 | Eldridge et al. | |
| 6,070,154 A | 5/2000 | Tavor et al. | |
| 6,073,242 A | 6/2000 | Hardy et al. | |
| 6,084,969 A | 7/2000 | Wright et al. | |
| 6,088,798 A * | 7/2000 | Shimbo | 713/176 |
| 6,092,202 A | 7/2000 | Veil et al. | |
| 6,102,287 A | 8/2000 | Matyas et al. | |
| 6,104,815 A | 8/2000 | Alcorn et al. | |
| 6,105,012 A | 8/2000 | Chang et al. | |
| 6,111,956 A | 8/2000 | Field et al. | |
| 6,134,325 A | 10/2000 | Vanstone et al. | |
| 6,154,543 A | 11/2000 | Baltzley | |
| 6,161,180 A | 12/2000 | Matyas et al. | |
| 6,161,181 A | 12/2000 | Haynes et al. | |
| 6,167,518 A | 12/2000 | Padgett et al. | |
| 6,189,096 B1 | 2/2001 | Haverty | |
| 6,192,130 B1 | 2/2001 | Otway | |
| 6,199,052 B1 | 3/2001 | Mitty et al. | |
| 6,202,151 B1 | 3/2001 | Musgrave et al. | |
| 6,213,391 B1 | 4/2001 | Lewis | |
| 6,230,269 B1 | 5/2001 | Spies et al. | |
| 6,243,812 B1 | 6/2001 | Matyas et al. | |
| 6,253,027 B1 | 6/2001 | Weber et al. | |
| 6,263,447 B1 | 7/2001 | French et al. | |
| 6,279,112 B1 | 8/2001 | O'Toole, Jr. et al. | |
| 6,282,522 B1 | 8/2001 | Davis et al. | |
| 6,285,991 B1 | 9/2001 | Powar | |
| 6,299,062 B1 | 10/2001 | Hwang | |
| 6,314,519 B1 | 11/2001 | Davis et al. | |
| 6,324,525 B1 | 11/2001 | Kramer et al. | |
| 6,373,950 B1 | 4/2002 | Rowney | |
| 6,510,516 B1 | 1/2003 | Benson et al. | |
| 6,523,067 B2 | 2/2003 | Mi et al. | |
| 6,532,451 B1 | 3/2003 | Schell et al. | |
| 6,565,000 B2 | 5/2003 | Sehr | |
| 6,571,339 B1 | 5/2003 | Danneels et al. | |
| 6,587,837 B1 | 7/2003 | Spagna et al. | |
| 6,594,633 B1 | 7/2003 | Broerman | |
| 6,618,483 B1 | 9/2003 | Vanstone et al. | |
| 6,671,805 B1 | 12/2003 | Brown et al. | |
| 6,704,870 B2 | 3/2004 | Vanstone et al. | |
| 7,051,206 B1 * | 5/2006 | Giest et al. | 713/176 |
| 7,308,096 B2 * | 12/2007 | Okeya et al. | 380/28 |
| 2001/0000535 A1 | 4/2001 | Lapsley et al. | |
| 2002/0120846 A1 | 8/2002 | Stewart | |

FOREIGN PATENT DOCUMENTS

| | | |
|---|---|---|
| EP | 807911 | 11/1997 |
| WO | WO 99057835 | 11/1999 |

OTHER PUBLICATIONS

Digital Signature Guidelines Tutorial; ABA Network, (web site at http://www.abanet.org/scietech/ec/isc/dsg-tutorial.html), pp. 1-7, date of capture Feb. 18, 2003.

Gerck, Ed, Overview of Certification Systems: x.509, PKIX, CA, PGP & SKIP—Do you understand digital certificates? Do you know what they warrant? pp. 1-18, Jul. 18, 2000.

Linn, John, Trust Models and Management in Public-Key Infrastructures; RSA Laboratories, pp. 1-13, Nov. 6, 2000.

PKCS #5, v2.0: Password-Based Cryptography Standard, RSA Laboratories, Redwood City, CA; pp. 1-30, Mar. 25, 1999.

PKCS #9, v2.0: Selected Object Classes and Attribute Types, RSA Laboratories, Redwood City, CA; pp. 1-34, Feb. 25, 2000.

PKCS #10, v1.7: Certificate Request Syntax Standard, RSA Laboratories, Redwood City, CA; pp. 1-10, May 26, 2000.

PCKS #12, v1.0: Personal Information Exchange Syntax, RSA Laboratories, Redwood City, CA; pp. 1-23, Jun. 24, 1999.

PCKS #15: Conformance Profile Specification; RSA Laboratories, Redwood City, CA; pp. 1-8, Aug. 1, 2000.

Guide to Internet Security; Public Key Cryptography (web site at http://www.e-certify.com/library/pkc_guide.htm) captured on Feb. 18, 2003.

Cylink atm encryptor (web site at http//securitytools.hypermart.net/security_1/cylink_atm_encryptor.html), p. 1, date of capture Feb. 18, 2003.

Bal's PGP Public Key Server; The Computer Law Resource 1996; (web site at http://www.complaw.com/pgp/webkeyserver.html), pp. 1-2, date of capture Feb. 18, 2003.

Kaliski, Burton S., Jr., Some Examples of the PKCS Standards, An RSA Laboratories Technical Note, RSA Laboratories, Redwood City, CA., pp. 1-15, dated Nov. 1, 1993.

Kaliski, Burton S., Jr., A Layman's Guide to a Subset of ASN.1, BER, and DER, An RSA Laboratories Technical Note, RSA Laboratories, Redwood City, CA., pp. 1-36, dated Nov. 1, 1993.

PKCS Editor, PKCS #1 v2.1: RSA Cryptography Standard, RSA Laboratories, Draft 2, RSA Laboratories, Bedford, MA, pp. 1-60, dated Jan. 5, 2001.

PKCS #3: Diffie-Hellman Key-Agreement Standard, An RSA Laboratories Technical Note, Version 1.4, RSA Laboratories, Redwood City, CA. pp. 1-8, dated Nov. 1, 1993.

PKCS #6: Extended-Certificate Syntax Standard, An RSA Laboratories Technical Note, Version 1.5, RSA Laboratories, Redwood City, CA. pp. 1-11, dated Nov. 1, 1993.

PKCS #8: Private-Key Information Syntax Standard, An RSA Laboratories Technical Note, Version 1.2, RSA Laboratories, Redwood City, CA. pp. 1-5, dated Nov. 1, 1993.

Wiener, Michael J., Performance Comparison of Public-Key Cryptosystems, Technical Newsletter of RSA Laboratories, a div of RSA Data Security, Inc., vol. 4, No. 1, pp. 1-23, Summer 1998, date of capture Jun. 20, 2005.

Maurer, Ueli, Modeling a Public-Key Infrastructure, Dept. of Computer Science, Swiss Federal Institute of Technology, pp. 1-26, Sep. 1996.

Security Requirements for Cryptographic Modules, FIP Standards Pub. 140-1, Jan. 11, 1994 pp. 1-45, CSL Bulletin for FIPS 140-1 pp. 1-6, 2001/2000.

Heroux, Mark, A Private Key Storage Server for DCE—Functional Specification, Open Software Foundation Request for Comments; 94.1, (http://www.opengroup.org/rfc/mirror); Nov. 1996.

Answers to Frequently Asked Questions about Today's Cryptography, RSA Data Security, Inc., Revision 2.0, pp. 1-44, Oct. 5, 1993.

Announcing the Standard for Digital Signature Standard (DSS), Federal Information Processing Standards Publication 186, pp. 1-18, May 19, 1994.

"X9 Overview," American Bankers Association web page (web site at http://www.x9.org/aboutX9.htm), 1998, 3 pp, date of capture Jan. 11, 1999.

Kaliski, Burton S., Jr. An Overview of the PKCS Standards, RSA Laboratories Technical Note, RSA Data Security, Inc. Public-Key Cryptography Standards (PKCS), pp. 1-27, Nov. 1, 1993.

Public Key Cryptography, NIST Special Publication 800-2, reprinted at http://csrc.nist.gov/publications/nistpubs/800-2/800-2.txt), pp. 1-138, Apr. 1991.

Guideline for Implementing Cryptography in the Federal Government, NIST Special Publication 800-21, pp. 1-138, Nov. 1999.

Guideline for the Use of Advanced Authentication Technology Alternatives, FIPS Pub. 190, reprinted at http://csrc.nist.gov/publications/fips/fips190/fip190.txt), pp. 1-55, Sep. 28, 1994.

Security Requirements for Cryptographic Modules, FIPS Publication 140-2, pp. 1-62, May 25, 2001.

Secure Hash Standard, FIPS Publication 180-1, pp. 1-24, Apr. 17, 1995.

Digital Signature Standard (DSS), FIPS Publication 186-2, pp. 1-72, Jan. 27, 2000.

Entity Authentication Using Public Key Cryptography, FIPS Publication 196, pp. 1-52, Feb. 18, 1997.

Computer Data Authentication, FIPS Publication 113, (web site at www.itl.nist.gov/fipspubs/fip113.htm), pp. 1-7, date of capture Jan. 16, 2001.

Public Key Infrastructure, An NSS Group White Paper, by Bob Walder, undated, reprinted http://www.nss.co.uk/WhitePapers/PublicKeyInfrastructure.htm, pp. 1-18, date captured on on Jan. 25, 2001.

Understanding Public Key Infrastructure (PKI), Technology White Paper, by RSA Security, Inc., pp. 1-10, 1999.

"X9.59 Working Draft" ABA; American National Standard X9.59-199X, For the Financial Services Industry: Account-Based Secure Payment Objects, pp. 1-26, Sep. 25, 1998.

Wheeler, Lynn, Account Authority Digital Signature Model web page (web site at http: www.garlic.com/~lynn/aadsover.htm) believed available at website after Nov. 8, 1997, 5 pp, date of capture Oct. 2, 2001.

"How PGP Works," web pages from www.pgpi.org, containing basic information, data captured on May 6, 2004.

PGP Certificate Server, Total Network Security, Network Associates, 3965 Freedom Circle, Santa Clara, CA 95044-1203, dated Oct. 1999.

"PGP Desktop Security 7.0," PGP Security, 3965 Freedom Circle, Santa Clara, CA 95054-1203, dated Jul. 2000.

"Inside PGP Key Reconstruction: Technical Details," Revision by Will Price, A PGP Security, Inc. White Paper, dated Jul. 25, 2000.

Barwood, George "Elliptic curve cryptography FAQ v1.12, Dec. 22, 1997", http://www.cryptoman.com/elliptic.htm, date of capture Apr. 15, 2005, pp. 1-9.

Disclosure Statement Under 37 C.F.R. 1.56 as filed Jan. 16, 2009.

* cited by examiner

GENERATE
PUBLIC KEY (PuK)

GENERATE DIGITAL
SIGNATURE (DS)

PROVIDING DIGITAL SIGNATURE AND PUBLIC KEY BASED ON SHARED KNOWLEDGE

CROSS REFERENCE TO RELATED APPLICATIONS

This application claims priority to U.S. Provisional Patent Application No. 60/641,957 filed Jan. 7, 2005 entitled "Soft Token: Offset Inventions," and U.S. Provisional Patent Application No. 60/641,958 filed Jan. 7, 2005 entitled "Soft Token: Passphrase Inventions," the disclosures of which are incorporated by reference herein in their entireties.

This application is also related to the following U.S. patent applications, the disclosures of which are incorporated by reference herein in their entireties:

1. U.S. Patent Application "ASYMMETRIC KEY CRYPTOSYSTEM BASED ON SHARED KNOWLEDGE" filed on Aug. 8, 2005;
2. U.S. Patent Application "VERIFYING DIGITAL SIGNATURE BASED ON SHARED KNOWLEDGE" filed on Aug. 8, 2005;
3. U.S. Patent Application "DIGITAL SIGNATURE SYSTEM BASED ON SHARED KNOWLEDGE" filed on Aug. 8, 2005;
4. U.S. Patent Application "SOFTWARE FOR PROVIDING BASED ON SHARED KNOWLEDGE PUBLIC KEYS HAVING SAME PRIVATE KEY" filed on Aug. 8, 2005;
5. U.S. Patent Application "PROVIDING CRYPTOGRAPHIC KEY BASED ON USER INPUT DATA" filed on Aug. 8, 2005;
6. U.S. Patent Application "GENERATING PUBLIC-PRIVATE KEY PAIR BASED ON USER INPUT DATA" filed on Aug. 8, 2005;
7. U.S. Patent Application "GENERATING DIGITAL SIGNATURES USING EPHEMERAL CRYPTOGRAPHIC KEY" filed on Aug. 8, 2005;
8. U.S. Patent Application "FACILITATING DIGITAL SIGNATURE BASED ON EPHEMERAL PRIVATE KEY" filed on August 2005;
9. U.S. Patent Application "DIGITAL SIGNATURE SOFTWARE USING EPHEMERAL PRIVATE KEY AND SYSTEM" filed On Aug. 8, 2005;

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

TECHNICAL FIELD

The present invention relates generally to cryptosystems and cryptography, and relates more particularly to methods involving aspects of deterministic functions in elliptic curve cryptography (ECC) in connection with authentication, digital signatures, and security of electronic communications including electronic financial transactions, and still more particularly to aspects of providing additional security by use of shared knowledge in an ECC deterministic function.

BACKGROUND OF THE INVENTION

A cryptosystem is a method of disguising messages so that only certain people can see through the disguise and interpret the message. Cryptography is the art and science of creating and using cryptosystems. Cryptosystems and cryptography are often used in connection with the conduct of electronic transactions and communications such as, for example, electronic financial transactions. Basically, a cryptosystem involves the generation of an encryption key that is used to encrypt a message; only a person that has a corresponding decryption key can decipher the message.

There are two principal types of cryptosystems: symmetric and asymmetric. Symmetric cryptosystems use the same key (a secret key) to encrypt and decrypt the message. Asymmetric cryptosystems use one key (for example a public key) to encrypt a message and a different key (a private key) to decrypt the message. Asymmetric cryptosystems are also called "public key" or "public key/private key" cryptosystems.

Symmetric cryptosystems have the following inherent problem: how does one transport the secret key from the send of a message to the recipient securely and in a tamperproof fashion? If someone could send the secret key securely, then in theory he or she would not need a cryptosystem in the first place—the secure channel could be simply used to send the message. Often, trusted couriers and digital certificates are used as a solution to this problem. Another method for communicating symmetric keys (as well as messages) is the well-known RSA asymmetric public key cryptosystem, which is used in the popular security tool Pretty Good Privacy (PGP).

Another asymmetric cryptosystem is elliptic curve cryptography (ECC). This methodology, which is explained in greater detailed below, is an approach to public key/private key cryptography based on the mathematics of elliptical curves. An elliptical curve is a set of solutions $(x, y)$ to an equation of the general form $y2=x3+ax+b$, which is an open curve on a graph. In contrast, a circle is a form of closed curve that graphically represents a set of solutions to an equation of the form $(y-a)2=r2-(x-b)2$, where a and b are coordinates of the center of the circle and r is the radius. Elliptic curves as a mathematical phenomenon have been studied for the about 150 years, but the application of elliptic curves to cryptography was proposed circa 1985 independently by the researchers Neal Koblitz and Victor Miller.

An asymmetric cryptosystem may be generally represented as an encryption function $E(\ )$ and a decryption function $D(\ )$, such that $D((E(P))=P$, for any plaintext P. In a public key cryptosystem, $E(\ )$ can be easily computed from a public key (PuK), which in turn is related to and computed from a private key (PrK). The public key PuK is sometimes published so that anyone having the key can encrypt messages. If the decryption function $D(\ )$ cannot easily be computed from the public key PuK without knowledge of the private key PrK, but can be computed readily with the private key, then it follows that only the person who generated the private key PrK can decrypt the messages encrypted with the public key. This is an essential useful attribute of public key/private key cryptography. The reliability of public key/private key cryptography depends on the two keys, PuK and PrK.

Public key/private key cryptography has at least three principal applications. First is basic encryption—keeping the contents of messages secret. Second, digital signatures are implemented using public key/private key techniques. U.S. Pat. Nos. 6,851,054; 6,820,202; 6,820,199; 6,789,189; and others, the disclosures of which are incorporated by reference herein, are examples of digital signature type systems that utilize aspects of public key/private key cryptography. Third, electronic authentication systems that are not based strictly on conventional digital signature techniques may be implemented with public key/private key cryptography. Some of the foregoing incorporated and referenced patents describe certain aspects of such authentication systems.

With respect to the mathematical properties of elliptic curves, it is now known that specific operations can be geometrically defined that limit the number of points on an elliptic curve to a finite set of points defining a finite cyclic group. Such an elliptic curve group can be used in conjunction with the known Elliptic Curve Discrete Logarithm Problem (ECDLP) in an encryption scheme to create an elliptic curve cryptosystem, which is generally believed to be secure and powerful given current computing technologies.

In implementing ECC and, specifically, in generating an asymmetric public-private key pair for use in the Elliptic Curve Digital Signature Algorithm (ECDSA), an elliptic curve is defined by certain "domain" parameters, and a point is chosen along the elliptic curve that serves as a generator of a finite cyclic group, all the elements of which also lie along the elliptic curve. This generator is referred to as the "generating point" or "base point" (P). The domain parameters include: the field identification (or "Field ID") identifying the underlying finite or Galois field, traditionally represented as "F2p" or "F2m"; the curve comprising two coefficients "a" and "b" of the elliptic curve equation $y2=x3+ax+b \mod p$; a generating point (xp, yp); and the order of the generating point "n" comprising a prime number. Optionally, the domain parameters may include other specifications, such as, for example, a bit string seed of length 160 bits—if the elliptic curve is randomly generated in accordance with governmental standards, or a cofactor. The domain parameters further may include additional specifications, such as the appropriate bit length of a key.

In certain known methodologies for ECC, after a generating point (P) specified, a first public-private key is first generated essentially by obtaining a large random number (R) from a random number generator or pseudo random number generator; and then using the random number as a "multiplier" of the generating point (i.e., P is repeatedly "added" R times) to arrive at the public key (PuK). The random number multiplier used to generate the public key is the private key (PrK) of the public-private key pair.

Those skilled in the art will appreciate that an ECC public key is an element of the finite cyclic group of the elliptic curve generated by the generating point. Furthermore, because the multiplier (PrK) used to arrive at the public key is randomly generated, the function used to first generate the public-private key pair is a nondeterministic function to the extent that the private key is unknown, i.e., not yet generated. Indeed, certain governmental standards for ECC require that the private key be generated utilizing a random number generator or pseudo random number generator. Because generation of the public-private key pair is performed using a nondeterministic function and, specifically, because the private key is generated from a random number or pseudo random number generator, at least the private key must be saved to perform later cryptographic operations with either one of the keys of the public-private key pair. (Only the private key must be saved because, if the private key is known, then the function used to generate the public key is a deterministic function of the known private key, and the public key can be generated as needed.)

As mentioned above, certain known public key/private key cryptosystems typically utilize the random number approach in key generation. However, it is believed that additional security aspects for public key/private key generation can be obtained by utilizing measures other than strictly using a random number during in the key generation algorithms. A deterministic function, as compared to a nondeterministic function, can provide security that is more than adequate for many applications, especially in an elliptic curve cryptosystem, and may provide certain benefits not available in nondeterministic key generation approaches. For example, a deterministic function may be used to assist in securely storing a private key in an electronic device, or in generating a public key/private key pair for use in an "on demand" cryptographic operation in a computer system that itself may not be capable of storing or protecting the private key from access by potential eavesdroppers. Furthermore, a deterministic function can extend the usability of a public/private key pair by making a single private key useable by multiple parties while still being able to show intent between the two parties.

In utilizing ECC—or any other cryptographic system, any cryptographic key used for encryption must be protected from compromise, especially during storage. Otherwise, the integrity of the cryptographic system is jeopardized. For example, if an insecure or network-accessible computer system and/or software is used in connection with a cryptographic operation, there is a risk that the keys stored in that computer system could be obtained and improperly utilized.

One manner of securely storing a cryptographic key comprises encrypting the cryptographic key itself within a computer system as a function of a PIN, password, or passphrase of a user who is authorized to use the cryptographic key, and then to save or store the encrypted key indefinitely within the computer system. When the key is required for a particular cryptographic operation, the user must input into the computer system the PIN, password, or passphrase, which then is used to decrypt the key, and the decrypted key then is used, in turn, to perform the cryptographic operation. Thereafter, the decrypted key is deleted in the computer system, and the encrypted key remains saved or stored within the computer system for later decryption and subsequent use, as needed.

Safeguarding cryptographic keys, especially private keys in public-private key cryptographic systems, is important if adoption and use of cryptography by the general public in electronic communications is to become prevalent. The safeguarding of cryptographic keys is especially important in connection with the conduct of electronic transactions such as, for example, financial transactions. Facilitating the adoption and use of cryptography in such electronic communications—especially adoption and use of digital signatures—also is important, as demand for greater security, reliability, and accountability in such electronic communications is believed to be increasing.

However, there are applications where mere safeguarding of cryptographic keys is not sufficient to conveniently implement certain cryptographic operations, for example, when one party needs to communicate securely with multiple other parties, but still needs to differentiate the communications between the various multiple parties. A specific example of this need is a situation where a first party needs to securely communicate with a financial institution, and needs to share information with a service provider that provides services to the first party and the financial institution. Another example is a situation where a first party uses the same private key for certain encryption operations with multiple other parties, but each of the other parties is provided with and uses a different public key that is still operatively related to the same private key.

Another example of a need for different functionality in encryption operations is a situation where two different digital signatures are required in connection with an electronic transaction, where the same private key of a party is utilized, but where each different digital signature can be verified with a different public key. Such functionality would be useful in connection with record keeping and security of multiple transactions by a person with a financial institution, or in connection with record keeping and security of separate transactions with multiple other parties such as financial institutions or service providers.

Accordingly, there is a need for improved methods for securely generating and protecting cryptographic keys, especially in asymmetric public key/private key cryptosystems, and especially for cryptographic operations involving use of insecure computer systems and software, communications with multiple third parties, multiple transactions, record keeping of multiple transactions and multiple parties, and the like. Such improved methods are believed usefully for facilitating the adoption and use of cryptography for electronic communications, secure financial transactions, and in particular, the adoption and use of digital signatures in various applications.

SUMMARY OF THE INVENTION

Briefly summarized, many aspects and features of the present invention relate to, and are described in, the context of generating and safeguarding asymmetric keys, such as public key/private keys, for use in elliptic curve cryptography (ECC), but the present invention is not thereby necessarily limited to such cryptography. Particular aspects of the invention relate to safeguarding private keys, thereby facilitating adoption and use of cryptography in electronic communications and, in particular, adoption and use of digital signatures.

More particularly described, certain aspects of the invention(s) relate to the use of the same private key in multiple public-private key pairs that are established for communicating with different parties. Moreover, as will become apparent from the detailed discussions below, the present invention particularly relates to—but is not limited to—elliptic curve cryptography (ECC) and the use of the Elliptic Curve Digital Signature Algorithm (ECDSA). Accordingly, many aspects and features of the present invention relate to, and are described in, the context of ECC, but the present invention is not thereby necessarily limited to such cryptography.

The present invention includes many aspects and features. In accordance with a first aspect of the invention, a method performed by a first party of providing a public key of a public-private key pair for use in elliptic curve cryptography includes the steps of: identifying domain parameters of an elliptic curve for use in elliptic curve cryptography, the domain parameters including an initial generating point; transforming the initial generating point into a new generating point as a deterministic function; and generating within a computer system a public key as a deterministic function of a private key and the domain parameters, in which the new generating point is substituted for the initial generating point. The resulting public key, in conjunction with the private key, forms a public-private key pair that then can be used in elliptic curve cryptography and especially in a digital signature algorithm such as the Elliptic Curve Digital Signature Algorithm (ECDSA).

The step of identifying the domain parameters of the elliptic curve may include receiving an identification of the domain parameters from another party or, alternatively, may include selecting by the first party the domain parameters and communicating the selection to another party. Once received or selected, the step of identifying the domain parameters includes looking up from memory that which was received or selected as the domain parameters.

The step of transforming the initial generating point into a new generating point preferably includes the step of generating a transformer as a deterministic function of shared knowledge. In accordance with the invention, and as used herein, the phrase "as a deterministic function of" means that which follows the phrase is an argument of the function. Moreover, the use of "deterministic" to modify function means that the function, given a specific argument or a specific set of arguments of the function (depending on whether the function includes one or more arguments), returns the same result time and time again. It should also be noted that a function could depend upon arguments in addition to that which follows "as a deterministic function of", i.e., that which follows the phrase is not intended to be an exclusive list of all arguments of the function.

Furthermore, in accordance with the invention, and as used herein, the phrase "shared knowledge" has a defined meaning that is specific to the present application. In this context, shared knowledge means information known to multiple parties that serves as an argument for a deterministic function for transforming a given generating point of domain parameters of, for example, an elliptic curve used in elliptic curve cryptography. The shared knowledge permits each party to independently transform the generating point to arrive at a new generating point for use in elliptic curve cryptography, such as in generating public keys and digital signatures and in verifying digital signatures. Preferably, one of the parties knowing the shared knowledge will be the party that generates a digital signature, and another party will be the party that receives the digital signature and verifies the digital signature with a public key.

Generally, the shared knowledge includes particular information and may comprise, for example, an account number for an account of the first party that is maintained with another party, such as a financial institution with which the first party conducts business. The shared knowledge also may be an identifier of the first party that uniquely identifies the first party to another party.

The shared knowledge preferably is stored within the computer system of the first party or is input into a computer system of the first party as needed for transforming a given generating point. In this respect, the software utilized to transform the generating point may prompt the user to input the shared knowledge or to select the shared knowledge from a list.

It further is contemplated that the shared knowledge may be communicated to the first party and to the party with which the knowledge is to be shared by yet a third party. In this regard, it is contemplated that this third party may be a service provider that provides information to the two parties which information constitutes the shared knowledge.

In any of these aforementioned scenarios, the shared knowledge generally comprises particular information that is communicated to or between the first party and another party. However, in at least one alternative to this it is contemplated that the shared knowledge actually may be calculated from other particular information that is shared between the parties. In this regard, the shared knowledge itself may comprise a deterministic function of one or more arguments that are predefined between and known to the parties, whereby each party may independently arrive at the identical shared knowledge by independently calculating the deterministic function.

In any event, the deterministic function of the shared knowledge—whatever the shared knowledge may comprise—preferably outputs a large integer value constituting a transformer, and the step of transforming the initial generating point into the new generating point preferably includes the step of multiplying, through scalar multiplication, the initial generating point by the transformer to arrive at the new generating point.

In preferred embodiments of this aspect, the method includes the step of clearing from the computer system the new generating point following the step of generating the public key so that the generating point is no longer available within the computer system for regenerating the public key; and the step of exporting the public key from the computer system for communicating to another party. The step of clearing preferably includes overwriting the new generating point wherever it is stored or saved in memory of the computer system. The overwriting preferably includes wiping or writing pseudo random bit strings to the data blocks of the computer memory in which the generating point is saved or stored. Of course, the step of clearing does not necessarily include clearing from a secure data storage memory or device (referred to herein as a "secure store") associated with a computer system.)

In a feature of this aspect of the invention, the method includes a step of determining the private key. In this regard, the step of determining the private key includes generating the private key as a nondeterministic function utilizing a random number or pseudo random number generator. If already generated in this manner, then the step of determining the private key includes retrieving the private key from a secure store of the computer system. Methods utilizing this feature are believed to be in compliance with governmental standards for ECC.

In accordance with an alternative feature of this aspect of the invention, the step of determining the private key includes generating the private key as a deterministic function of user input data (sometimes referred to herein as "UID") that is received within a computer system of the first party. The UID may comprise, for example, a passphrase, a password, or a PIN. Alternatively, or in addition thereto, the user input data may comprise a biometric characteristic. Furthermore, if the private key is generated within the computer system as a result of user input data, then both the user input data and the private key preferably are cleared from the computer system so that the user input data must be received again within the computer system in order to regenerate the private key for further cryptographic activities. Indeed, because the private key is generated as a deterministic function of the UID, the private key need not be saved in a secure store.

The computer system of the first party in which the public key is generated preferably is a personal electronic device of the first party that includes an integrated circuit or application-specific integrated circuit (ASIC) and may comprise, for example, a personal computer, a personal digital assistant (PDA), a smartcard, or a smartphone or other telephonic device.

Another aspect of the invention relates to an improvement on a conventional method of providing a public key of a public-private key pair of a first party for use in elliptic curve cryptography, which conventional method includes the step of generating a public key as a deterministic function of a known private key and known domain parameters of an elliptic curve for use in elliptic curve cryptography, wherein the domain parameters include a generating point. As a result of this conventional method, the generated public key includes, in conjunction with the private key, a public-private key pair for use in elliptic curve cryptography. In accordance with this aspect of the invention, the improvement includes the steps of: calculating a larger integer value as a deterministic function of shared knowledge that is shared between the first party and a second party different form the first party, multiplying the generating point of the domain parameters by the calculated integer value to obtain a new generating point, and then replacing the generating point of the domain parameters with the new generating point in the otherwise conventional step of generating the public key as a deterministic function of the private key and the domain parameters. Other than utilizing the new generating point in lieu of the initial generating point of the domain parameters, the deterministic function utilized is the same as the conventional deterministic function in accordance with elliptic curve cryptography.

Another aspect of the invention relates to a method for providing two different public keys of two different public-private key pairs of a first party for use in elliptic curve cryptography. The method includes the steps of, with respect to the first public key, identifying domain parameters of an elliptic curve for use in elliptic curve cryptography, the domain parameters including an initial generating point; transforming in a deterministic function the initial generating point into a new generating point; and generating the first public key as a deterministic function of a private key and the domain parameters, in which the new generating point is substituted for the initial generating point. The generated public key, in conjunction with the private key, comprises the first public-private key pair for use in elliptic curve cryptography. The method further includes, with respect to the second public key, transforming in a deterministic function the initial generating point of the domain parameters into a second new generating point; and generating the second public key as a deterministic function of the same private key and the domain parameters, in which the second new generating point is substituted for the initial generating point. The second public key comprises, in conjunction with the same private key, the second public-private key pair for use in elliptic curve cryptography that is different from the first public-private key pair.

Another aspect of the invention relates to providing a digital signature using the elliptic curve digital signature algorithm (ECDSA). The method uses a private key of a public-private key pair of a first party for use in elliptic curve cryptography. The method includes the steps of: identifying domain parameters of an elliptic curve for use in elliptic curve cryptography, wherein the domain parameters include an initial generating point; transforming the initial generating point into a new generating point as a deterministic function; and generating within a computer system of the first party a digital signature as a deterministic function of a private key and the domain parameters, in which the new generating point is substituted for the initial generating point. The step of transforming the initial generating point into a new generating point preferably includes the step of generating a transformer as a deterministic function of shared knowledge. The public key used to verify the digital signature preferably is provided in accordance with the aspects of the invention set forth above.

Preferred methods of this aspect include the additional steps of: clearing from the computer system the new generating point following the step of generating the digital signature so that the generating point is no longer available within the computer system for generating a digital signature; determining the private key; clearing the private key from the computer system (but not from a secure store if provided as part of the computer system to hold the private key) following the step of generating the digital signature so that the private key is no longer available within the computer system for generating a digital signature; and exporting the generated digital signature from the computer system for communicating to the second party. The clearing steps preferably include overwriting the new generating point and the private key wherever they are stored or saved in memory of the computer system. The overwriting preferably includes wiping or writing pseudo random bit strings to the data blocks of the computer memory in which the generating point and private key are saved or stored. (Of course, the step of clearing does not necessarily include clearing from a secure store.)

Another aspect of the invention relates to an improvement on a conventional method of providing a digital signature using a private key of a public-private key pair of a first party in elliptic curve cryptography. This conventional method includes the step of generating a the digital signature as a deterministic function of the private key and domain parameters of an elliptic curve for use in elliptic curve cryptography, wherein the domain parameters include a generating point. In accordance with this aspect of the invention, the improvement includes the steps of calculating a larger integer value as a deterministic function of shared knowledge; multiplying the generating point of the domain parameters by the calculated integer value to obtain a new generating point; and then replacing the generating point of the domain parameters with the new generating point in the otherwise conventional step of generating the digital signature as a deterministic function of the private key and the domain parameters. Other than utilizing the new generating point in lieu of the initial generating point of the domain parameters, the deterministic function utilized to generate the digital signature is the same as the conventional deterministic function in accordance with elliptic curve cryptography.

Yet another aspect of the invention relates to a method of providing two digital signatures in accordance with the elliptic curve digital signature algorithm (ECDSA), wherein the same private key of a first party is utilized, but wherein each digital signature can be verified with a different respective public key. The method includes the steps of, with respect to the first digital signature: identifying domain parameters of an elliptic curve for use in elliptic curve cryptography, the domain parameters including an initial generating point; transforming in a deterministic function the initial generating point into a first new generating point; and generating the first digital signature as a deterministic function of the private key and the domain parameters, in which the first new generating point is substituted for the initial generating point. The method further includes the steps of, with respect to the second digital signature: transforming in a deterministic function the initial generating point of the same domain parameters into a second new generating point; and generating the second digital signature as a deterministic function of the same private key and the domain parameters, in which the second new generating point is substituted for the initial generating point. The different respective public keys are provided by: generating the first public key as a deterministic function of the same private key and the same domain parameters, in which the first new generating point is substituted for the initial generating point; and generating the second public key as a deterministic function of the same private key and the same domain parameters, in which the second new generating point is substituted for the initial generating point.

Another aspect of the invention relates to a method of verifying a digital signature from a first party that has been provided in accordance with the aforementioned aspects. In this regard, the method includes the steps of: receiving a public key from the first party; receiving a digital signature from the first party, the digital signature being for an electronic message; identifying domain parameters of an elliptic curve used in elliptic curve cryptography, including identifying a generating point of the elliptic curve; transforming the identified generating point into a second generating point as a deterministic function of shared knowledge; and verifying the received digital signature as a deterministic function of the received public key, the electronic message, and the identified domain parameters, in which the second generating point is substituted for the identified generating point of the domain parameters. One or more of these steps preferably are performed in a computer system of a second party receiving the public key and digital signature.

Preferred methods in accordance with this aspect further include the step of clearing from the computer system the second generating point following the step of verifying the digital signature so that the second generating point is no longer available within the computer system for verifying a digital signature.

Another aspect of the invention relates to an improvement on a conventional method of verifying a digital signature of a first party by a second party as a deterministic function of a known public key, a known electronic message, and known domain parameters of an elliptic curve, including a generating point of the curve, wherein the digital signature was generated with an elliptic curve digital signature algorithm (ECDSA). This conventional method includes the step of verifying the digital signature as a deterministic function of the public key and domain parameters of an elliptic curve for use in elliptic curve cryptography, wherein the domain parameters include a generating point. In accordance with this aspect of the invention, the improvement includes the steps of calculating a large integer value as a deterministic function of shared knowledge; multiplying the generating point of the domain parameters by the calculated integer value to obtain a new generating point; and then replacing the generating point of the domain parameters with the new generating point in the otherwise conventional step of verifying the digital signature as a deterministic function of the public key, electronic message, and the domain parameters. Other than utilizing the new generating point in lieu of the initial generating point of the domain parameters, the deterministic function utilized to verify the digital signature is the same as the conventional deterministic function in accordance with elliptic curve cryptography.

Another aspect of the invention relates to an overall digital signature system that includes the aforementioned aspects of providing a public key, providing a digital signature, and verifying the digital signature utilizing the public key. In this system, both the public key and the digital signatures are generated using the elliptic curve domain parameters in which the generating point is replaced with or substituted by a new generating point based on a transformation of the initial generating point as a deterministic function of shared knowledge. Furthermore, a preferred such system includes the provision of multiple public keys that are generated as a deterministic function of the same private key and different generating points, whereby digital signatures generated as a deterministic function of the same private key and one of these generating points can be verified with the respective public key generated with such generating point.

Yet another aspect of the invention relates to a method for facilitating digital signature communications of a first party with multiple third parties, and includes the distribution of software by a second party for use by the first party in accomplishing such communications. The method includes the steps of communicating software to the first party; receiving back from the first party multiple public keys generated using the software; and recording in a database the public keys in association with information pertaining to the software communicated to the first party and used to generate the public keys. The public keys preferably are generated in accordance with one or more of the aforementioned aspects of the invention. The software further preferably generates digital signatures for later verification using the public keys generated by the software.

The software itself preferably includes identifying information that identifies the software to the second party, and this identifying information is included in the response having the public keys. The identifying information may include a hash value of the software and may be digitally signed by the software. An identifier of, or other information regarding, the first party also may be communicated to the second party, which identifier or other information, if included, also preferably is recorded in the database in association with the public keys and the information pertaining to the software.

The method further may include the steps of: receiving by the second party a request from a third party, the request including a public key of the first party, and in response, communicating by the second party to the third party the recorded information pertaining to the software used to generate the public key; and receiving by the second party a request from a third party, the request including an identifier of the first party to the second party, and in response, communicating by the second party to the third party the recorded information pertaining to the software used to generate public keys of the first party.

In features of one or more of the aforementioned aspects, the private key is generated within the computer system as a deterministic function of user input data, and a digital signature is generated not only as a deterministic function of this private key and domain parameters, including a substituted generating point, but also as a deterministic function of an indicator of whether a digital signature has been generated since the last generation of the private key within the computer system. The indicator additionally, or alternatively, may indicate whether a digital signature was previously generated as a function of the substituted generating point since the last transforming of the generating point. The deterministic function for generating the digital signature preferably includes appending or pre-pending a value of the maintained indicator to an electronic message prior to digitally signing the electronic message.

Preferably, for security, the user input data is cleared from the computer system following the step of generating the private key so that the user input data no longer remains available within the computer system for regenerating the private key. Consequently, the user input data must be received again within the computer system in order to regenerate the private key within the computer system using the deterministic function. The user input data received may represent a passphrase, password, or PIN, or may represent a biometric characteristic, either of the first party or an authorized user of the first party.

The clearing of the private key may be performed at different times following generation of the digital signature. Indeed, once the private key is generated within the computer system, additional digital signatures may be generated with the private key prior to its being cleared from the computer system. In this scenario, the private key preferably is cleared within a predetermined time such as, for example, within a single hour, minute, or second of generating the private key. Alternatively, the period of time may comprise the time period beginning with the step of generating the private key and ending with a predetermined event such as, for example, the termination of a communications session of the computer system; if generation of the digital signature was performed in response to a digital signature request received from a particular program, then with receipt of a subsequent digital signature request from a different program; and the generation of a particular number of digital signatures using the particular manifestation of the private key.

Of course, if only one digital signature is to be generated with the particular manifestation of the private key, then the private key preferably is cleared immediately upon the generating of the digital signature.

Other aspects of the invention include computer-readable media having computer-executable instructions for performing any of the aforementioned methods.

In all of the foregoing aspects and features of the invention, the shared knowledge may be maintained in secret by the parties sharing the knowledge so as to constitute a shared secret between the parties. Furthermore, in addition to the aforementioned aspects and features of the present invention, it should be noted that the present invention further includes the various possible combinations of such aspects and features.

DETAILED DESCRIPTION

Figure 1:
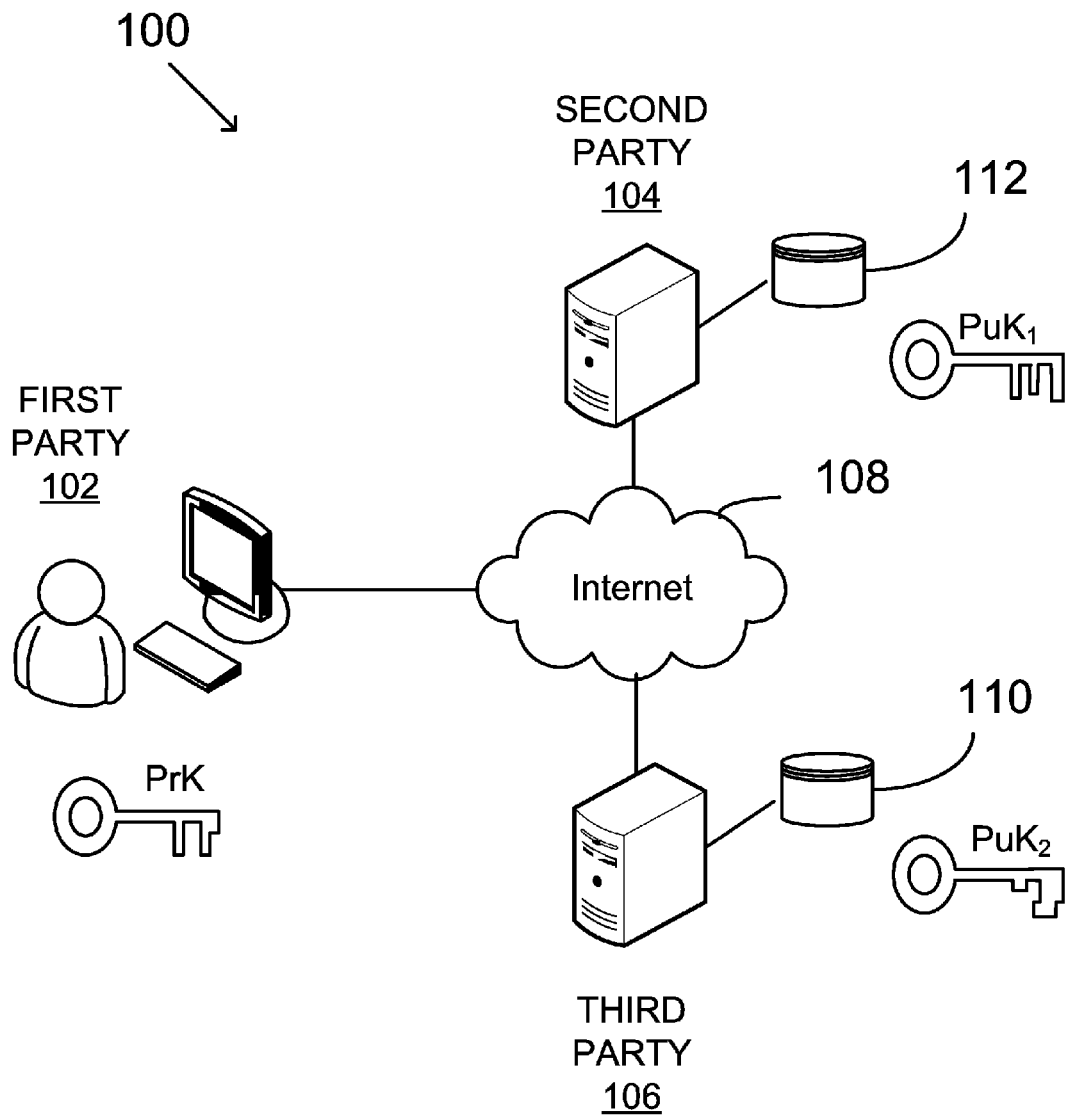
FIG. 1 illustrates a preferred system 100 for digital signature communications in accordance with the invention.

As a preliminary matter, it will readily be understood by one of ordinary skill in the relevant art that the invention has broad utility and application. Furthermore, any embodiment discussed and identified as being "preferred" is generally considered to be part of a best mode contemplated for carrying out the invention. Other embodiments also may be discussed for additional illustrative purposes in providing a full and enabling disclosure of the invention. Moreover, many embodiments, such as adaptations, variations, modifications, and equivalent arrangements, will be implicitly disclosed by the embodiments described herein and fall within the scope of the invention.

Accordingly, while the invention is described herein in detail in relation to one or more embodiments, it is to be understood that this disclosure is illustrative and exemplary of the invention, and is made merely for the purposes of providing a full and enabling disclosure of the invention. The detailed disclosure herein of one or more embodiments is not intended, nor is to be construed, to limit the scope of patent protection afforded the invention, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention is to be defined by the appended claims rather than the description set forth herein.

Additionally, it is important to note that each term used herein refers to that which a person skilled in the art would understand such term to mean based on the contextual use of such term herein. To the extent that the meaning of a term used herein—as understood by a person skilled in the art based on the contextual use of such term—differs in any way from any particular dictionary definition of such term, it is intended that the meaning of the term as understood by a person skilled in the art should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

Additionally, when used herein to join a list of items, "or" generally denotes "at lease one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" generally denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Turning now to the drawings, in which like numerals indicate like elements or steps throughout the several drawing figures, FIG. 1 illustrates a preferred system 100 for digital signature communications in accordance with aspects of the invention. In this regard, a first party 102 has generated two public keys PuK1, PuK2 utilizing one of the methods described below in greater detail, and has respectively communicated via the Internet 108 each of these two public keys to separate parties 104, 106. Furthermore, in generating the first key PuK1, the first party 102 preferably used an identifier that identifies the first party 102 to the second party 104, which identifier constitutes the shared knowledge between the first party 102 and the second party 104. Likewise, the first party 102 preferably used an identifier (different from the other identifier used by the second party 102) that identifies the first party 102 to the third party 106, which identifier constitutes the shared knowledge between the first party 102 and the third party 104. This difference in the identifiers is reflected in FIG. 1, wherein the two public keys have dissimilar configurations as a direct consequence of the two identifiers being different.

As further illustrated in FIG. 1, the second party 104 has recorded the public key PuK1 received from the first party 102 in a database 112 and, preferably, the second party 104 has recorded the PuK1 in association with the respective account number of an account maintained by the first party 102 with the second party 104. Similarly, the third party 106 has recorded the public key PuK2 received from the first party 102 in a database 110 and, preferably, the third party 106 has recorded the PuK2 in association with the respective account number of an account maintained by the first party 102 with the third party 106.

As will be appreciated from the foregoing detailed description of the invention, the first party 102 in system 100 may securely communicate with either the second party 104 or the third party 106 using digital signatures by generating the digital signatures with the same private key PrK used to generate each of the two public keys PuK1, PuK2. Specifically, the first party 102 may generate digital signatures in accordance with either of preferred methods 1200, 1300 for verification with the first public key PuK1 by the second party 104 in accordance with preferred method 100. Likewise, the first party 102 may generate digital signatures in accordance with either of preferred methods 1200, 1300 for verification with the second public key PuK2 by the third party 106 in accordance with preferred method 100. Moreover, even though the same private key PrK is used to generate all of the digital signatures, the second party 104 cannot verify digital signatures intended for the third party 106, and the third party 106 cannot verify digital signatures generated for the second party 104, because the respective identifiers (i.e., the respective shared knowledge) differs as between the second and third parties.

Figure 2:
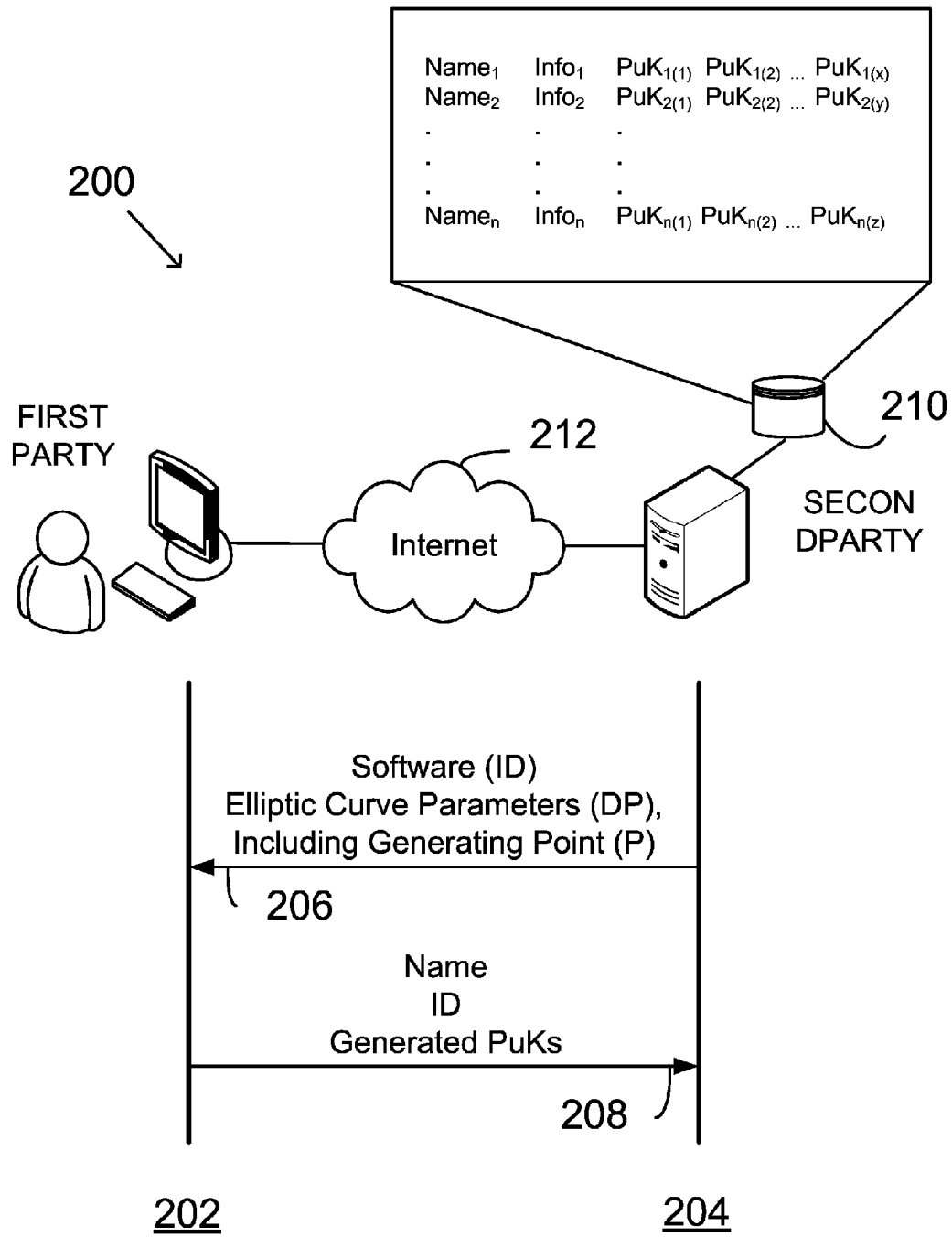
FIG. 2 illustrates a preferred system 200 for recording public keys and related information, which public keys are generated in accordance with the invention.

FIG. 2 illustrates a preferred system 200 in which multiple public keys of a first party 202 are generated utilizing one of the preferred methods 300, 400 and registered with a second party 204. The second party may comprise, for example, an entity that serves as a resource available via the Internet for ascertaining information regarding certain public keys generated using software of the second party 204.

In preferred system 200, the first party 202 obtains software from the second party 204. The software may be communicated 206 via the Internet 212 from a computer system of the second party 204 as shown in FIG. 2. The software preferably includes the ability to generate public and private keys of a public-private key pair in accordance with the aforementioned preferred methods of the invention, and includes the ability to generate digital signatures using the private key of the key pair, wherein the algorithm utilized to generate the digital signatures preferably is the ECDSA. Furthermore, the elliptic curve parameters—including the generating point—are communicated between the parties 202, 204 and, preferably, are included as predefined parameters contained within the software communicated to the first party 202 by the second party 204.

Identifying information (sometimes abbreviated as "ID") of the communicated software preferably is included with the software, whereby a communication 208 back over the Internet 212 that includes the identifying information will enable the second party 204 to identify the particular software. The identifying information may include a hash value, and the identifying information may be digitally signed, to provide some measure of insurance to the second party regarding the true identity of the software.

Upon receipt of the software, the first party 202 installs and runs the software. In FIG. 2, the software is installed and executed within a computer system of the first party 202 comprising a desktop computer; however, any suitable computer system may be utilized by the first party 202 such as, for example, a personal digital assistant (PDA), laptop computer, or telephonic device like a smart phone.

Figure 14:
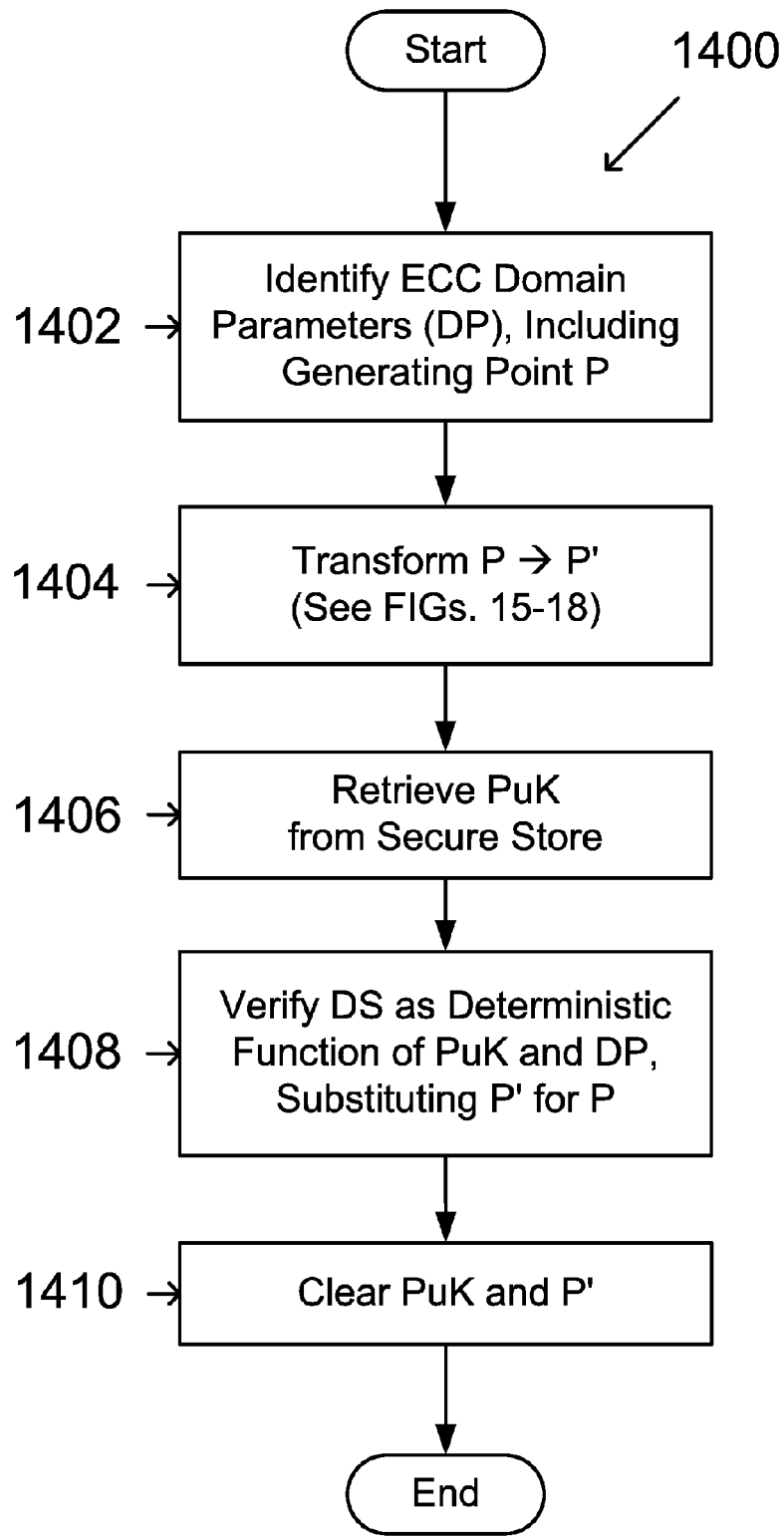
FIG. 14 illustrates a preferred method 1400 for verifying a digital signature generated in accordance with the invention.

Preferably during an initialization period or installation setup of the software, the first party 202 generates a private key in accordance with preferred method 1400 of FIG. 14. The first party also enters respective shared knowledge for each public key to be generated in accordance with one of preferred methods 1000, 1100. In cases where the first party 202 will be communicating using digital signatures with third party financial institutions with which the first party 202 maintains accounts, the first party may enter the accounts numbers as the respective shared knowledge for each of the financial institutions. In accordance with the invention, these financial institutions each will know that the account number of the first party 202 comprises the shared knowledge when verifying digital signatures of the first party 202. Such information will be provided to the financial institutions by the first party 202, or this arrangement will have been predetermined between the financial institutions and the first party 202 prior to generation of the public keys.

Following generation of the public keys via the software utilizing one of preferred methods 1000, 1100, the first party 202 then communicates 208 the generated public keys back to the second party 204 together with the software ID and, optionally, a name of the first party 202. The first party 202 preferably does not communicate therewith to the second party any shared knowledge utilized in generating the public keys for communicating with the third parties. Upon receipt of the communication back from the first party 202, the second party 204 preferably records in a database 210 a record associating the generated public keys received together with information about the software that was communicated by the first party 204 to the first party 202 and used to generate the public keys. This information pertaining to the software is known to the second party 204 upon the receipt of the ID, which identifies the software to the second party 204. Furthermore, if included, the name of the first party 202 also is recorded with the public keys and serves to identify the generated public keys of the first party 202 in the database 210. The name may comprise, for example, an alias or an email address of the first party 204.

This information that is recorded in the database 210 in association with the generated public keys preferably pertains to the software utilized to generate the public keys, and may include, for example: information about the deterministic function used in the software to generate the private key based on the UID; information about when the UID is cleared and how it is cleared; information about when the private key is cleared and how it is cleared; information about the deterministic function used in the software to transform the generating point; information about when the new generating point is cleared and how it is cleared; information about when the shared knowledge is cleared and how it is cleared; information about the deterministic function used in the software to generate the public key; information about if and when the public key is cleared and how it is cleared; and an identification of the algorithm utilized for generating digital signatures, including domain parameters.

As will be appreciated from FIG. 2, this registration process of preferred system 200 is performed by the second party 204 numerous times with other third parties, whereby the database 210 contains a plurality "n" records, each record including a name associated with multiple public keys and information regarding the software utilized in generating the public keys.

Following the registration process, the first party 202 may communicate with one of its third party relationships, such as a financial institution, reliably and securely, provided that the third party trusts the second party 204 and the information recorded in the database 210 by the second party 204. Thus, for example, in FIG. 3, an exemplary system 300 is illustrated for facilitating communication between the first party 202 and a third party relationship 302 using a digital signature generated in accordance with the invention.

In system 300, the first party 202 communicates 304 over the Internet 212 to the third party 302 a name of the first party 202 that identifies the account of the first party 202 with the third party 302, an electronic message, and a digital signature for the message that is generated using the private key of the first party 202 as well as the shared knowledge between the first party 202 and the third party 302 (i.e., the account number of the first party 202 with the third party 302). If the third party has not yet received and associated a public key from the first party 202 generated in accordance with the invention, then the first communication 304 further includes therein the public key for recording by the third party 302 in association with the account of the first party 202.

Figure 13:
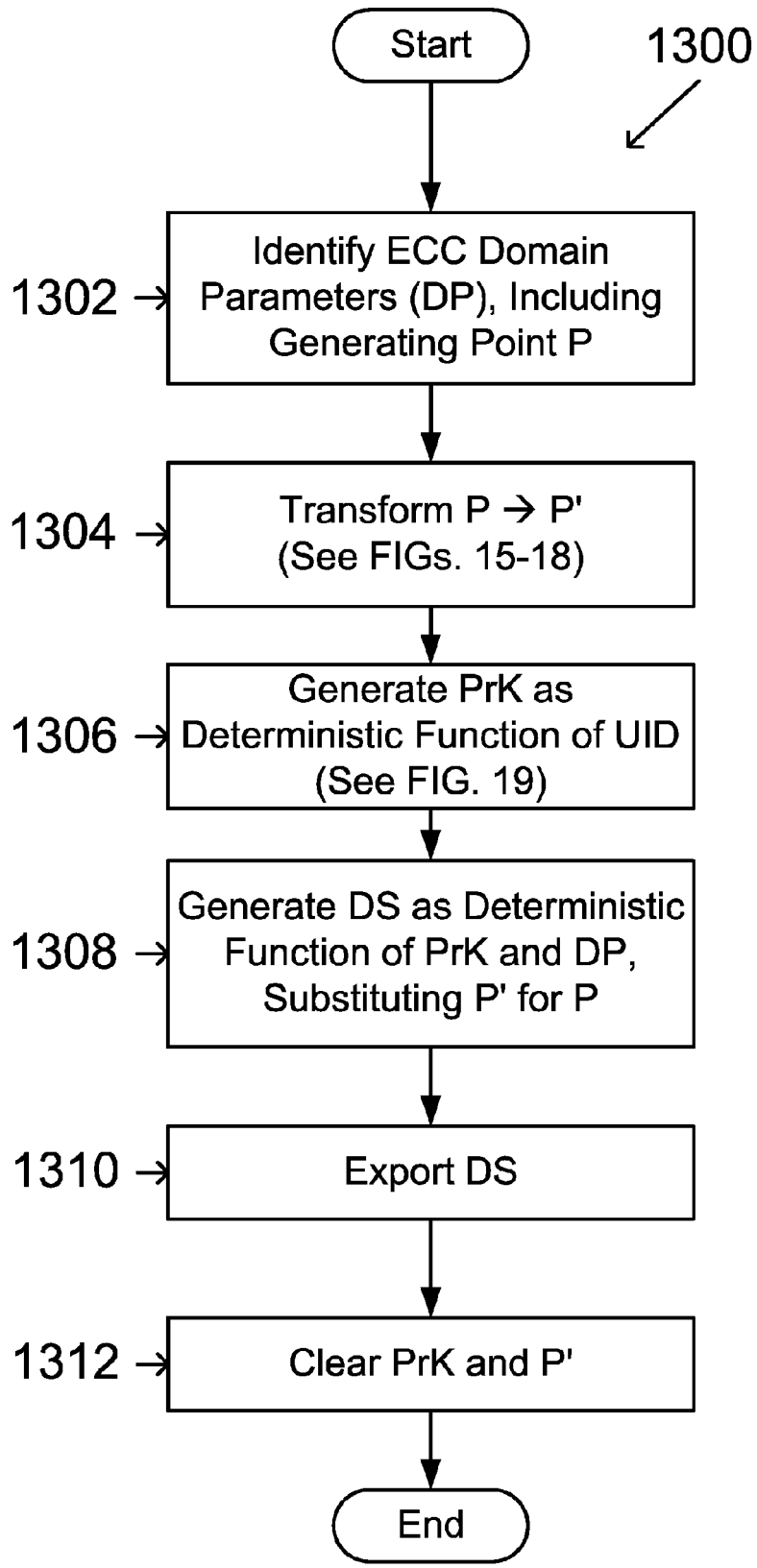
FIG. 13 illustrates in greater detail an alternative preferred method 1300 for providing a digital signature in accordance with the invention.

Upon receipt of the communication from the first party 202, the third party 302 verifies the digital signature in accordance with the preferred method 1300 of FIG. 13 utilizing the public key received in communicates 304 and the shared knowledge, i.e., the account number of the first party 202 as identified by the third party 302 by the name included in the communication 304. Upon verification of the digital signature, the third party 302 communicates 306 to the second party 204 the public key received from the first party 202. Upon receipt of the public key, the second party 204 searches and retrieves from its database 210 the information that has been associated with the particular public key in the database 210 during the registration process in system 200 of FIG. 2. The second party 204 then communicates 308 this information retrieved from the database 210 to the third party 302. The communications 306, 308 in system 300 may be, for example, over the Internet 212, as shown in FIG. 3.

Upon receipt of the information from the second party 204 regarding the public key, the third party 302 may evaluate this information in gauging the risk that either the private key utilized to generate the digital signature was compromised and that the message was not, in fact, sent from the first party 202, or that the message was altered while in transit from the first party 202 to the third party 302. Indeed, a risk level can be assigned and taken under consideration in making a business judgment as to whether—and what—action to take, if any, in response by the third party 302 to receipt of a digitally signed message from the first party 202. The third party 302 further may request this information upon further receipt of digital signatures from the first party 202, or the third party 302 may itself record this information in association with the public key of the first party 202 in a database of the third party 302.

In an alternative system 300, the second party also records in the database an identification of a third party for each public key that is recorded on behalf of the first party. Consequently, the third party then may retrieve the information regarding the public key of the first party by communicating this identification and the name of the first party, rather than communicating the public key itself. This and other arrangements for recording and indexing the information for retrieval by the second party and communication to the third party are within the scope of the invention.

Figure 3:
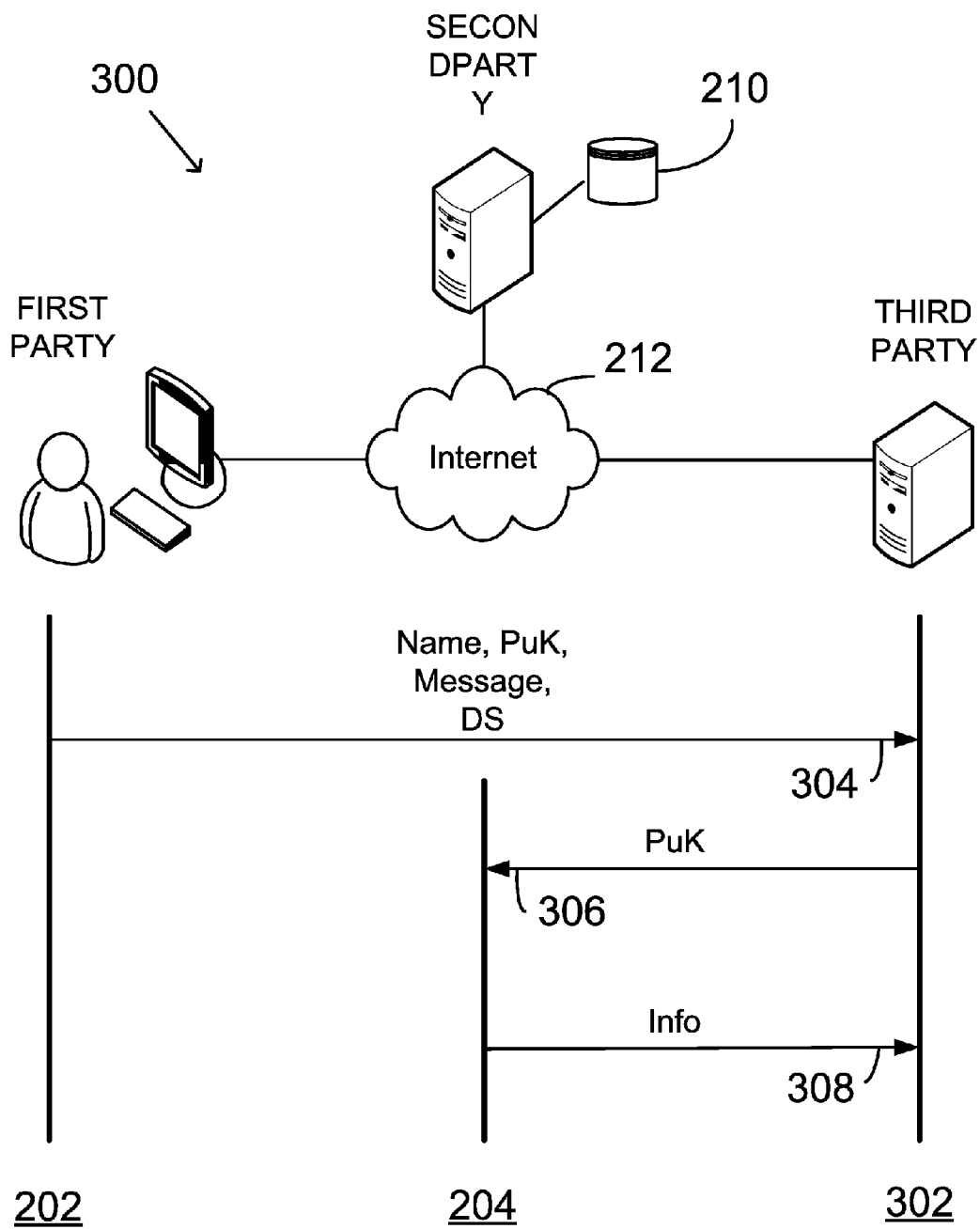
FIG. 3 illustrates a preferred system 300 for digital signature communications using a public-private key pair generated with the software of preferred system 200.

In FIG. 3, access to the database 210 by the third party 302 may be provided by the second party 204 free of charge or by subscription. Similarly, in FIG. 2, registration with the second party 204 by the first party 202 may be free or by subscription to services of the second party 204.

Figure 4:
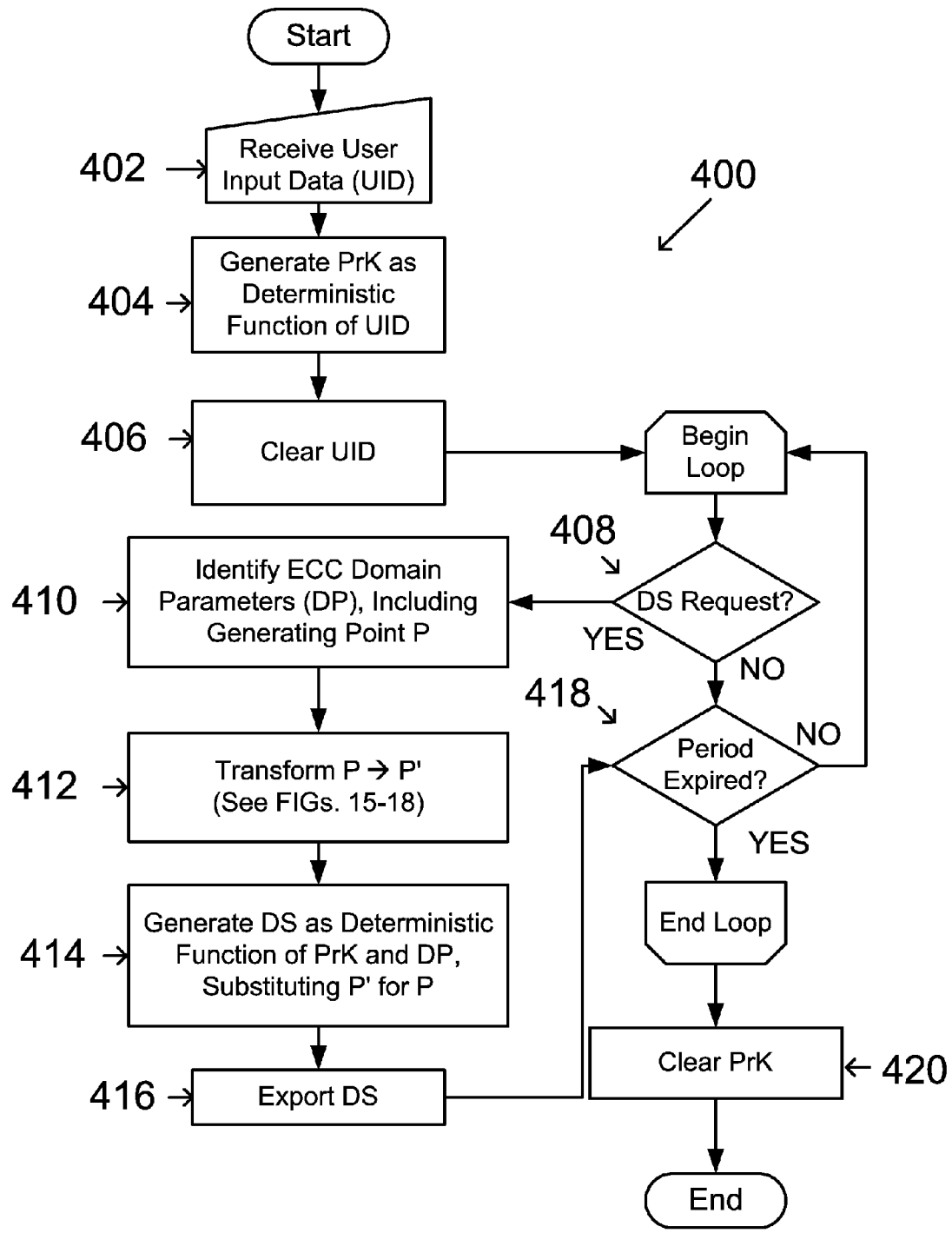
FIG. 4 illustrates another preferred method 400 for generating digital signatures in accordance with the invention.

A preferred method of conveniently generating multiple digital signatures in accordance with the invention is illustrated in FIG. 4. This method includes first generating the private key as a function of UID in accordance with method 1400 of FIG. 14, discussed above. Accordingly, the UID is received in Step 402, the private key is generated as a deterministic function of the UID in Step 404, and the UID is then cleared in Step 406.

After generation of the private key, a loop begins with a determination in Step 408 of whether a digital signature request is received. If a request is not received, then a determination is made in Step 418 whether a predetermined period of time has expired. During this period of time, multiple digital signatures may be generated without again reentering the UID and regenerating the private key in Steps 402, 404. If it is determined in Step 418 that the predetermined period of time has expired, then the private key is cleared in Step 420, after which Steps 402, 404 must be performed again in generating any further digital signature.

If a request for a digital signature is received, then the determination Step 408 is affirmative, and the ECC domain parameters, including generating point, are identified for a particular recipient of the digital signature to be generated. In this regard, it is contemplated that respective digital signatures for multiple recipients may be generated in method 400 and that, accordingly, the appropriate domain parameters must be identified for the intended recipient of the particular digital signature being generated.

Upon determination of the appropriate domain parameters, the identified generating point is transformed in Step 412 in accordance with one of preferred methods 1500, 1600, 1700, 1800. The transformation is performed based, in part, on the shared knowledge between the party generating the digital signature and the intended recipient of the digital signature.

Following Step 412, the digital signature is generated in Step 414 as a deterministic function of the generated private key and the domain parameters identified in Step 410; however, the new generating point (i.e., the transformed generating point) is substituted for the identified generating point in generating the digital signature in Step 414. The resulting digital signature is then exported in Step 416 from the computer system utilized to generate the digital signature for communication to the intended recipient. Thereafter, the determination of Step 418 is made.

As will be apparent from FIG. 4, Step 420 of clearing the private key from the computer system is performed within a predetermined period of time after the generating of the private key in Step 404. This predetermined period of time may be the period in which a predetermined number of digital signatures are generated using the generated private key. Alternatively, this period of time may begin with the generating of the private key in Step 404 and end with the termination of a communications session of the computer system. For example, the private key may be cleared when a web browser of the computer system ceases viewing a particular web page of an Internet domain. The communications session similarly may timeout, thereby causing the private key to be cleared from the computer system of the web browser. In another example, the generating of the digital signature may be in response to a request from a program for a digital signature. In this example, the period of time also may begin with the generating the private key and end with the request for a digital signature by a different program.

Prior to a discussion the specific methods of the present invention, an explanation of aspects of elliptic curve mathematics will be provided, so as to provide a framework for understanding certain aspects of the present invention. As mentioned in the background section, the field of elliptic curve cryptography is based on the mathematics relating to the geometric form of an elliptic curve. The mathematics and the form itself may be foreign to the casual observer, although well understood by mathematicians as well as cryptographers.

For the purposes of this discussion we will use a circle as a simplified replacement for an elliptic curve. This substitution is possible because of the nature of the invention and the fact that this discussion does not attempt to explain in detail the field of elliptic curve mathematics or cryptography. The discussion is presented in order to understand the nature of the invention only. The discussion will draw parallels to the elliptic curve mathematics and concepts but explain them in terms of a circle.

Figure 5:
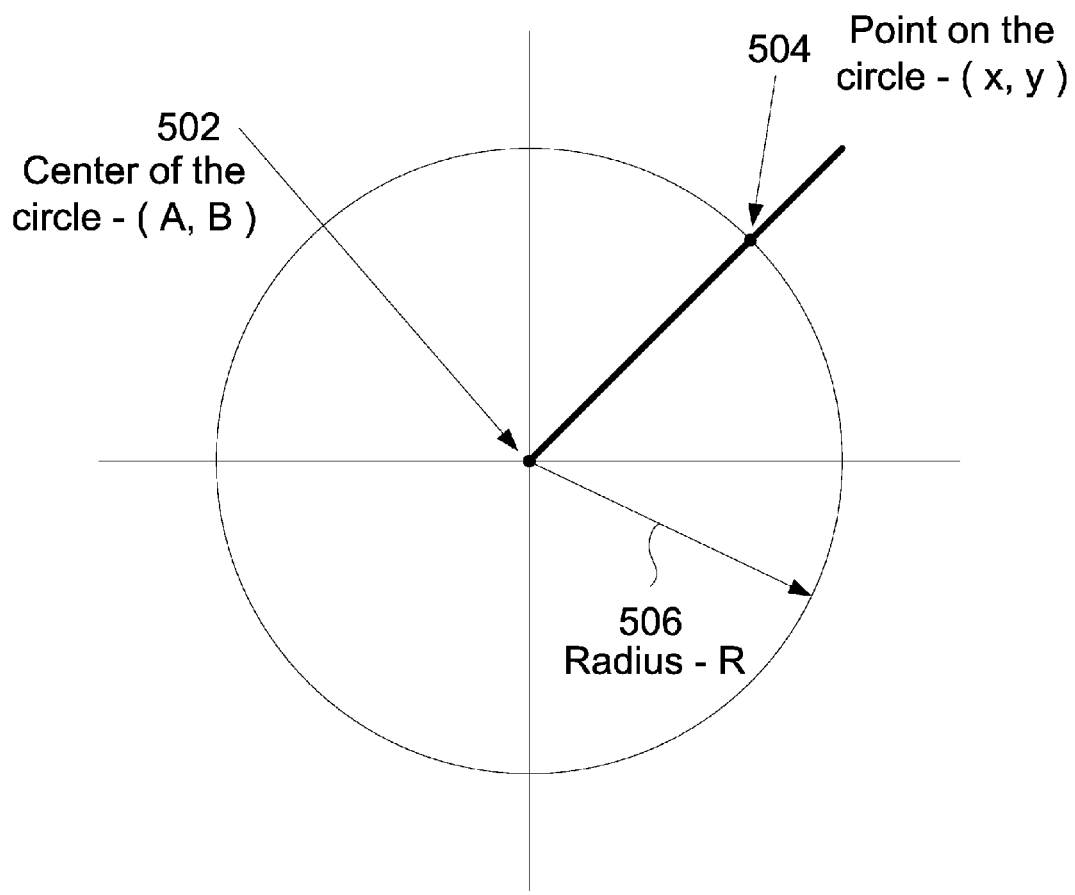
FIG. 5 illustrates a circle with its center at (A, B) and radius R.

A first point is to understand that an elliptic curve is simply a geometric shape, not unlike that of a circle (which is a closed shape) or an ellipse (which is also a closed shape), except that an elliptic curve is more of an open shape like a parabola. Many geometric shapes such as circles, ellipses, parabolas, and elliptical curves are definable by an equation that serves to describe the points (i.e. locations in space) that make up the geometry (shape) of the curve. A circle can be described in this same manner. FIG. 5 illustrates mathematical aspects of an exemplary geometric shape (a circle in this case), which for purposes of this simplified explanation bears certain mathematical similarities to elliptical curves.

For a circle such as is shown in FIG. 5, the equation is:

$$(x-A)^2 + (y-B)^2 = R^2$$

Where:
  a. x and y is the Cartesian coordinate (x, y) of a point on the circle 504;
  b. A and B (A, B) define the Cartesian coordinate of the center of the circle 502, A is used to represent the X axis term B represents the Y axis term; and
  c. R is the radius of the circle 506.

In order to describe the true geometric shape, other information is needed to define or differentiate the geometric shape from any other geometric shape of the same type.

Figure 6:
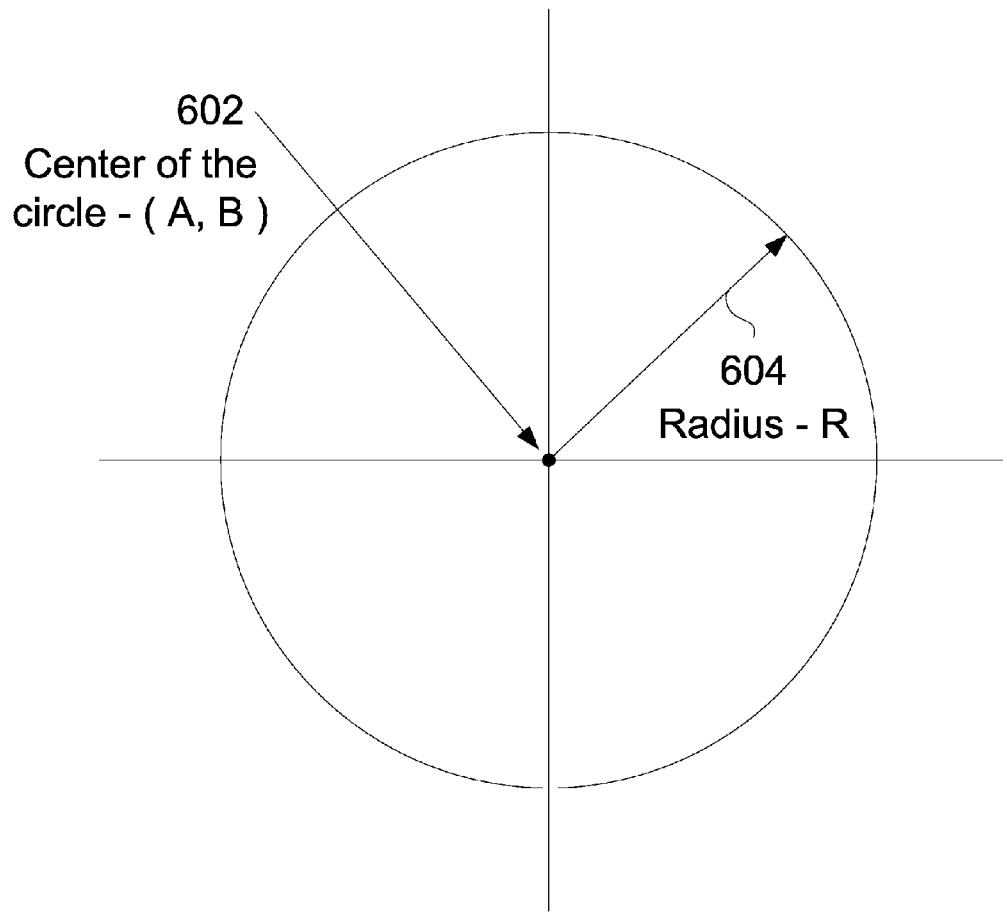
FIG. 6 shows the information needed to define a circle: center and radius.

As shown in FIG. 6, for a circle the information needed to define a specific circle is:
  A coordinate in Cartesian space that serves as the center of the circle (A, B) 602; and
  A radius that defines the boundary of the circle R 604.

With these two pieces of information, we can uniquely describe a specific circle and calculate all of the points—i.e. (x, y) coordinates—that make up the circle.

The foregoing information of a center coordinate and radius serves to define the 'Domain' of the circle, the make-up of the circle. With respect to elliptic curves, the terms 'Elliptic Curve Domain Parameters' are often used to represent the information that defines a specific elliptic curve. Elliptic curve domain parameters serve the same purpose as the A, B and R terms in the above definition of the circle. The 'Elliptic Curve Domain Parameters' while containing different values and having different meanings than those for the circle serve the same purpose, i.e. to uniquely define a particular geometric shape. In the discussion of the circle the 'Circle Domain Parameters' are A, B and R.

Public and Private Keys in ECC

The general conceptual nature of the public key and private key in the field of elliptic curve cryptography is the same as for other forms of asymmetric cryptography. Given one value that can be kept a secret (the private key), the second value that is derived from the first can be made public (public key). The reason that the second value (the public key) can be made public is that the cost to work backwards from the public key to the private key is computationally prohibitive. The other point that is worth noting is that even though the values are both referred to as "keys" does not mean that they are equivalent in use or that the values they represent are the same.

Refer again to the circle metaphor of FIG. 5 in connection with the following description of public/private key pairs in connection with elliptical curve cryptography. It will be recalled that the domain parameters of a circle allow a way to describe all the possible points on a circle. In order to derive public/private key pairs for use in a cryptography operation, we need to determine a set of values that are related to each other but are distinguishable from other pairs of values.

Figure 7:
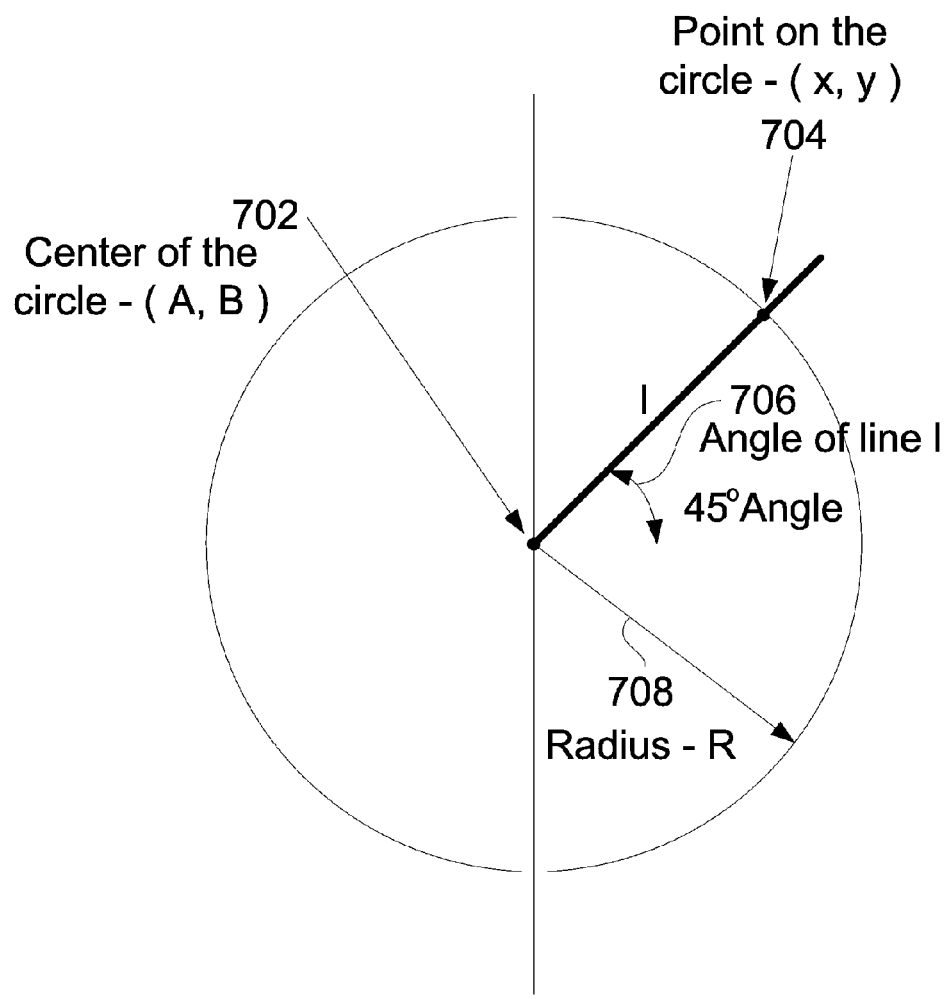
FIG. 7 shows an analogy of private key generation using a circle as a metaphor for an elliptic curve.

With respect to the circle metaphor, if you draw a straight line originating at the center of a circle and extend it to cross the circle, you have the two related points of information that we were looking for. These would be the (x, y) coordinate that falls on the definition of the circle and the related angle that represents the line that extends from the center of the circle to the actual coordinate on the circle itself. This is specifically illustrated in FIG. 7.

In a circle metaphor, these two pieces of information (a point on a circle 704, angle of the radius 706) can be utilized as a public/private key pair. The angle 706 may be utilized as a private key, while the (X, Y) point 704 may be utilized as the public key. If the radius R 708 is known, the value of the center of the circle (A, B) 702 (which may be considered the data values encrypted) cannot be determined from merely knowing the point (X, Y)—the angle (e.g. 45°) 706 must also be known in order to uniquely define a single point (A, B). Although this example using a circle as conceptually equivalent to an elliptic curve is contrived and computationally simple to break, it should now be understood that public key and private key for use in a cryptographic operation may be derived from a similar operation by using the mathematics of an elliptic curve, much in the same fashion as herein described in connection with the mathematics of a circle.

Key Generation in ECC

Many cryptography schemes, including conventional ECC, depend on properties of randomness for the actual generation of key pairs. In the circle metaphor we need to determine an angle that serves as the private key for a key pair and allow us to determine the matching (X,Y) coordinate that will serve as the related public key. The traditional method of generating a private key would be to use a random number in the generation of the angle. For example, we could generate a random number that is greater than −1 and less than 360 and this could serve as our 'private key' or 'angle'. With this angle we can mathematically determine the corresponding (X, Y) coordinate on the circle that is denoted by the angle. A side effect of using a random number for the generation of the angle is that you must store the angle once it is generated. The reason that the generated angle must be stored is that since it was generated through at Random (using a random number) it would be difficult (next to impossible) to regenerate the same Angle predictably.

At this point we have enough metaphorical information to begin to specifically address the nature of deterministic functions in ECC key generation. The basis of these aspects of the invention is that we are replacing the random number used in key generation with a calculation that can be repeated given the same input. This repeatable calculation is called a 'deterministic function'. A deterministic function is a calculation that, given a specific input, will always produce the same output. For example, 2 times X or (2*X) is a deterministic function. If you replace the 'X' term with the same number (e.g. 3) you will get a result that can be repeated every time you replace the 'X' term with that same number. Thus, the mathematical operation of (2*3) always produces 6, no matter how many times the computation is repeated—the answer will always be 6 when the 'X' term is replaced with 3.

In the "passphrase" aspects of the invention, described in greater detail in certain referenced related patent applications, the private key in a private/public key pair is generated through a deterministic function instead of the more traditional method of generating the private key through a random function. The passphrase could be a word a sentence or any string of characters that are memorable to the user. This passphrase serves as the input to a deterministic function that provides as output a value that is suitable for use as the private key. A simple example of a possible implementation of this concept is below (the algorithm and function are illustrative only).

In accordance with certain aspects of the so-called "passphrase" inventions, we first define a set of acceptable characters that can be used to form a passphrase. For our example we will use the common characters: alphabetic/numeric and punctuation. For each allowable character we assign a numeric value that will represent the character in our calculation. This provides a table such as shown in the following example:

TABLE 1

| Character | Value |
|---|---|
| ! | 33 |
| " | 34 |
| # | 35 |
| $ | 36 |
| % | 37 |
| & | 38 |
| ' | 39 |
| ( | 40 |
| ) | 41 |
| * | 42 |
| + | 43 |
| , | 44 |
| - | 45 |
| . | 46 |
| / | 47 |
| 0 | 48 |
| 1 | 49 |
| 2 | 50 |
| 3 | 51 |
| 4 | 52 |
| 5 | 53 |
| 6 | 54 |
| 7 | 55 |
| 8 | 56 |
| 9 | 57 |
| : | 58 |
| ; | 59 |
| < | 60 |
| = | 61 |
| > | 62 |
| ? | 63 |
| @ | 64 |
| A | 65 |
| B | 66 |
| C | 67 |
| D | 68 |
| E | 69 |
| F | 70 |
| G | 71 |
| H | 72 |
| I | 73 |
| J | 74 |
| K | 75 |
| L | 76 |
| M | 77 |
| N | 78 |
| O | 79 |
| P | 80 |
| Q | 81 |
| R | 82 |
| S | 83 |
| T | 84 |
| U | 85 |
| V | 86 |
| W | 87 |
| X | 88 |
| Y | 89 |
| Z | 90 |
| [ | 91 |
| \ | 92 |
| ] | 93 |
| ^ | 94 |
| _ | 95 |
| ` | 96 |
| a | 97 |
| b | 98 |
| c | 99 |
| d | 100 |
| e | 101 |
| f | 102 |
| g | 103 |
| h | 104 |
| i | 105 |
| j | 106 |
| k | 107 |
| l | 108 |
| m | 109 |

TABLE 1-continued

| Character | Value |
|---|---|
| n | 110 |
| o | 111 |
| p | 112 |
| q | 113 |
| r | 114 |
| s | 115 |
| t | 116 |
| u | 117 |
| v | 118 |
| w | 119 |
| x | 120 |
| y | 121 |
| z | 122 |
| { | 123 |
| \| | 124 |
| } | 125 |
| ~ | 126 |

Next, a deterministic function is defined that will turn a word, sentence, or any string of characters into a value suitable as a replacement for the random angle value. One example of a deterministic function is to cumulate the numerical values of the characters of an input string (e.g. the word "PassWord"), divide by a predetermined number (e.g. 360), and use the remainder of the division operation as an angle value. Such an exemplary determination would be expressed as follows in conceptual terms:

1. Start with a value of zero in the 'Passphrase Work Value', which is a cumulation data variable.
2. For every character in the input string (e.g. "PassWord"), look up the value corresponding to that character and add it to the value in the data variable 'Passphrase Work Value'.
3. When all of the input characters of the string are exhausted, divide the cumulative value in 'Passphrase Work Value' by 360, and assign the remainder of this division (Modulo 360) to 'PassphraseAngle'
4. The value or number of the variable 'PassphraseAngle' is then utilized as a private key.

Assume that the input or passphrase is the string "PassWord" without the quotes. If we start with zero (0) in the 'Passphrase Work Value' and take the first character ("P") of the string and look it up in the above table we find the value 80. Add this value to the 'Passphrase Work Value' giving the value 80 for 'Passphrase Work Value'. Move to the next character ("a") in the string and perform the same lookup as before, which yields the value 65. Add the value 65 to the 'Passphrase Work Value', which cumulates to 145. Continue this process until there are no more characters in the input string. In this example, the cumulated values of the passphrase "PassWord" would yield the following computation:

TABLE 2

| P | a | s | s | W | o | r | d | Passphrase Work Value |
|---|---|---|---|---|---|---|---|---|
| 80 | | | | | | | | 80 |
| | 97 | | | | | | | 177 |
| | | 115 | | | | | | 292 |
| | | | 115 | | | | | 407 |
| | | | | 87 | | | | 494 |
| | | | | | 111 | | | 605 |
| | | | | | | 114 | | 719 |
| | | | | | | | 100 | 819 |

When the input characters of the string "PassWord" are exhausted, the value of 627 remains in the variable Passphrase Work Value. Based upon the definition of our deterministic function, 819 is divided by 360:

819/360=2 (with a remainder of 99)

The remainder of this division operation is assigned to be the 'Passphrase Angle' and may be utilized as a private key in accordance with this example.

The foregoing example is provided in conjunction with a mathematical shape of a circle. Those skilled in the art will understand and appreciate that the same general principles may be employed in connection with the mathematics of an elliptical curve, so as to define an angle that can uniquely define a point along an elliptical curve (as opposed to a circle), and that this point may be utilized as the public key for private key/public key cryptographic operations in accordance with aspects of the invention.

Figure 8:
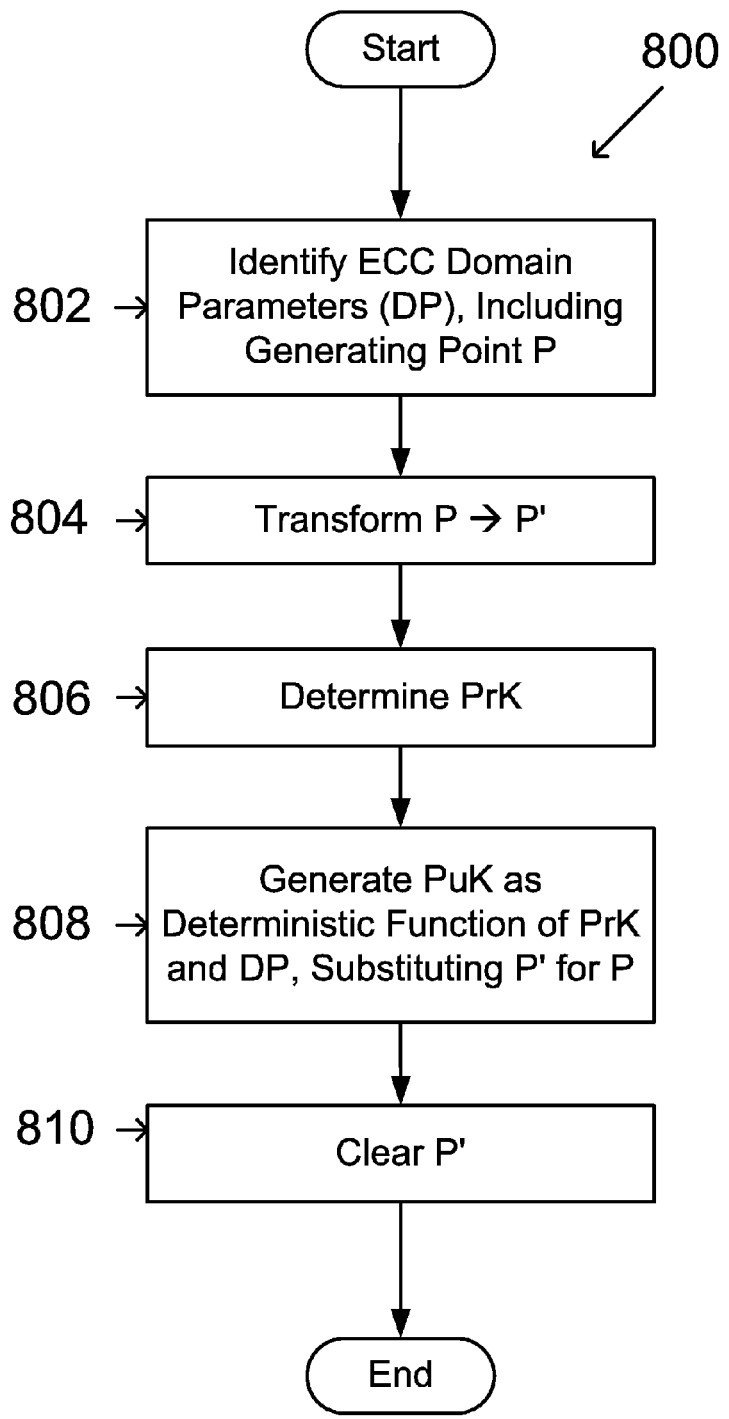
FIG. 8 illustrates a method 800 in accordance with the invention for providing a public key.
Figure 9:
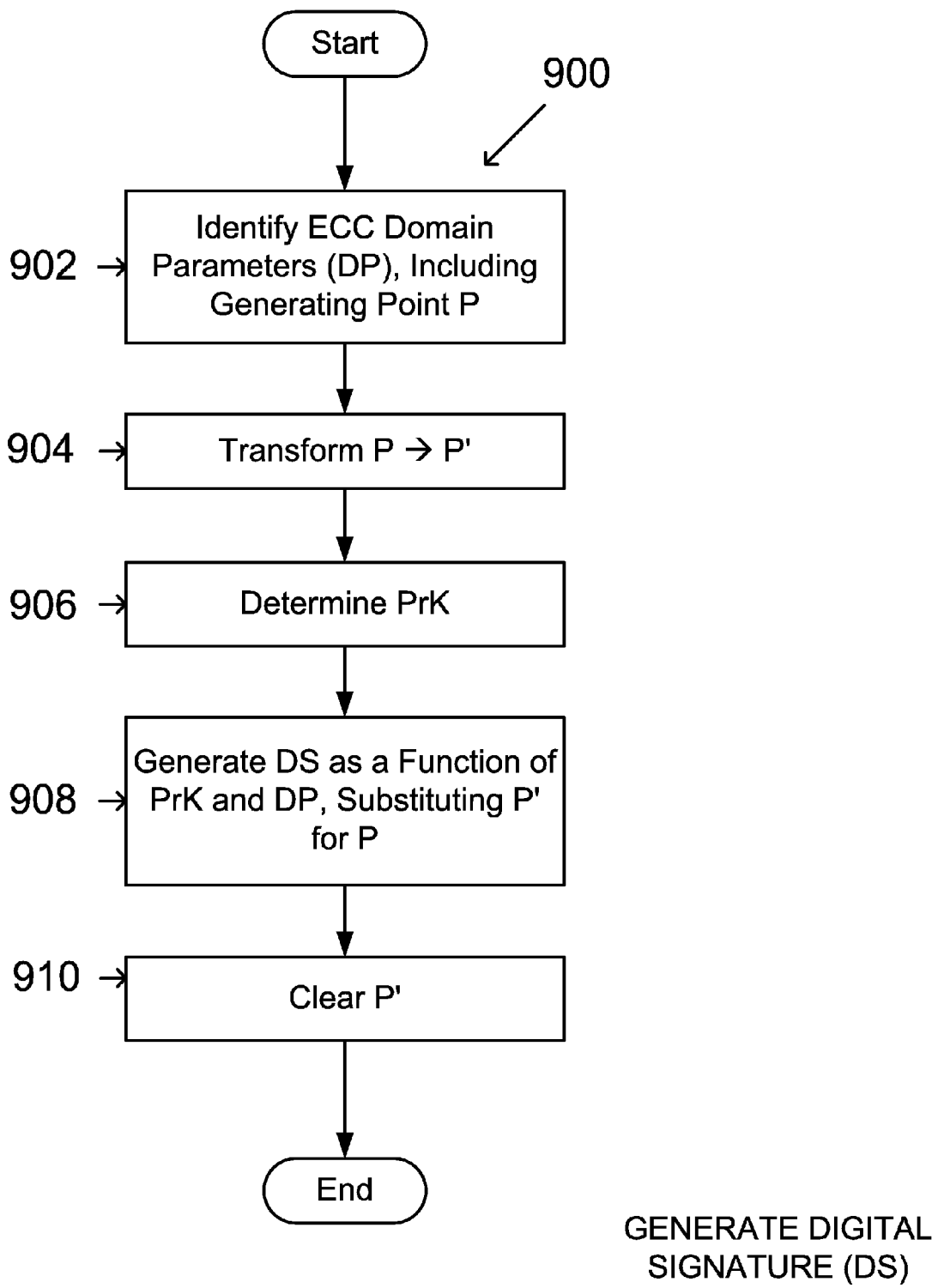
FIG. 9 illustrates a method 900 in accordance with the invention for providing a digital signature.

Specific Methods for Utilizing Shared Information for Providing Cryptographic Keys With the foregoing principles in mind, we turn next to a discussion of aspects of the use of shared information in connection with key generation, according to aspects of the inventions. FIG. 8 and FIG. 9 illustrate certain methods 800, 900, respectively, in accordance with aspects of the invention. Method 800 provides a public key in accordance with an aspect of the invention, and method 900 provides a digital signature in accordance with another aspect of the invention.

In accordance with method 800, domain parameters DP for an elliptic curve used in elliptic curve cryptography are identified by a first party in Step 802. Domain parameters for an elliptic curve used in elliptic curve cryptography are well known, and conventionally include therein a generating point P. The step of identifying the domain parameters of the elliptic curve preferably includes receiving an identification of the domain parameters from another party or, alternatively, selecting by the first party the domain parameters and communicating the selection to another party. Once received or selected, the step of identifying the domain parameters thereafter comprises looking up that which was received or selected.

In further accordance with method 800, the generating point P is transformed by the first party in Step 804 into a new generating point P', and a private key is determined by the first party in Step 806. A public key then is generated by the first party in Step 808 as a deterministic function of the private key and the identified domain parameters; however, rather than using the generating point P of the domain parameters, as would be conventional in generating a public key from a private key in elliptic curve cryptography, the new generating point P' is substituted for this original generating point P of the domain parameters in Step 808. After generating the public key in Step 808, the new generating point P' is cleared in Step 810 from the computer system utilized to generate the public key by the first party.

In accordance with method 900, domain parameters DP for an elliptic curve used in elliptic curve cryptography are identified by the first party in Step 902, and the generating point P is transformed by the first party in Step 904 into a new generating point P'. A private key also is determined by the first party in Step 906. Thereafter, a digital signature is generated by the first party in Step 908 as a deterministic function of the private key and the identified domain parameters; however, rather than using the generating point P of the domain parameters, as would be conventional in generating a digital signature from a private key in elliptic curve cryptography, the new generating point P' is substituted for this original generating point P of the domain parameters in Step 908. After generating the digital signature in Step 208, the new generating point P' is cleared in Step 910 from the computer system utilized to generate the digital signature by the first party.

Those skilled in the art will understand that, for generation of a digital signature in accordance with certain known standard, such as ECDSA for example, a random value (nondeterministic) function is used in the digital signature generation. However, it will be appreciated that a deterministic function could be used for digital signature generation in application that do not require a random number function or other nondeterministic function.

Figure 10:
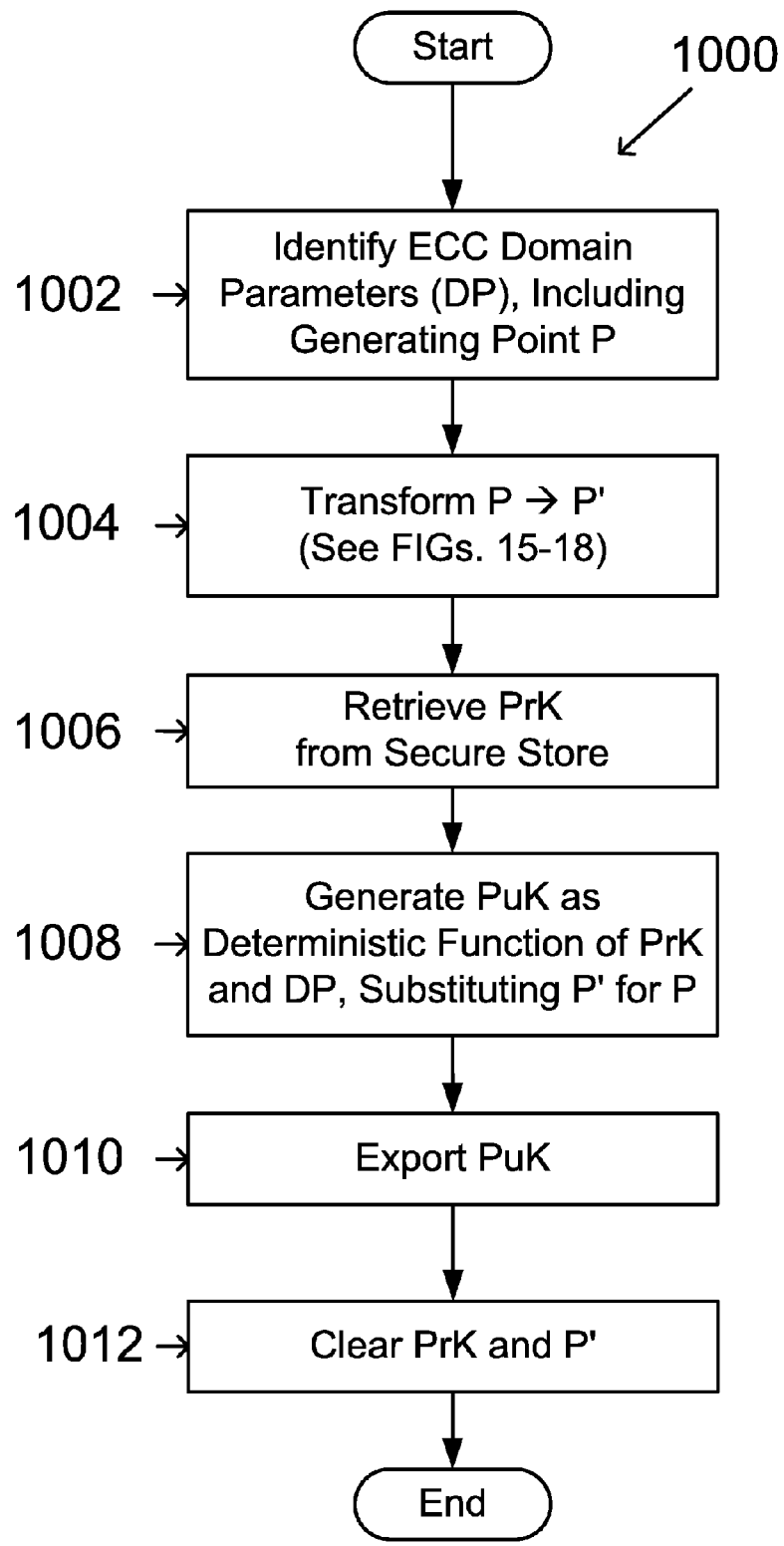
FIG. 10 illustrates in greater detail a preferred method 1000 for providing a public key in accordance with the invention.
Figure 11:
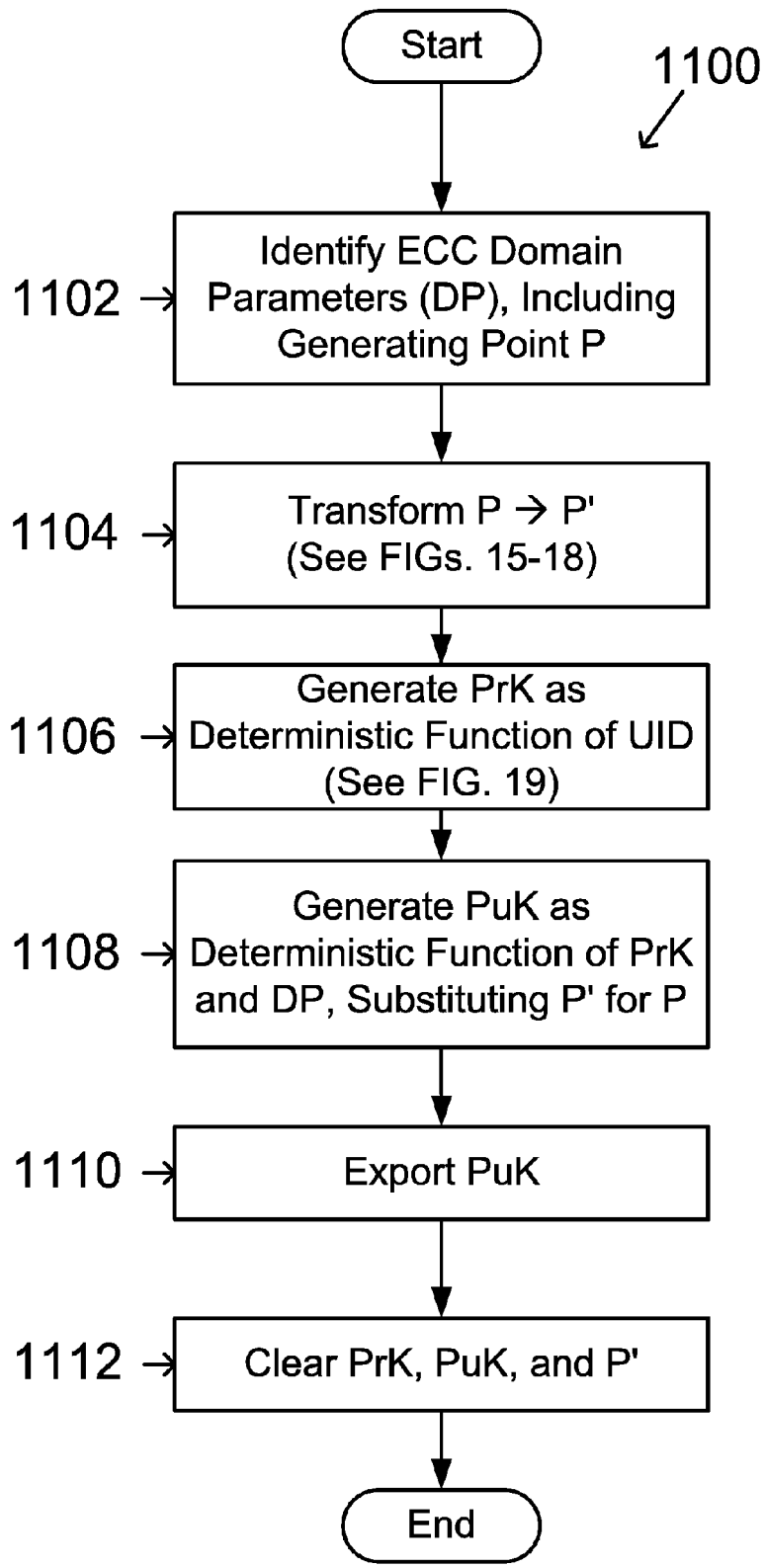
FIG. 11 illustrates in greater detail an alternative preferred method 1100 for providing a public key in accordance with the invention.

FIG. 10 and FIG. 11 illustrate preferred methods 1000, 1100, respectively, for providing a public key in accordance with the invention, and each method 1000, 1100 represents a species of the invention embodied in method 800. In accordance with described method 1000, domain parameters DP for an elliptic curve used in elliptic curve cryptography are identified in Step 1002, including the identification of a generating point P. The generating point P is transformed in Step 1004 into a new generating point P'. Several preferred methods exist for transforming the generating point into the new generating point, four of which are illustrated in FIGS. 15-18, discussed below. Any one of these methods may be utilized in Step 1004.

Continuing with method 1000, a private key is determined in Step 1006 by retrieving the private key from a secure store. The secure store preferably comprises hardware of the first party designed to securely store the private key and safeguard it from being divulged without authorization, and the secure store may be physically integrated with other hardware of the computer system in which the public key is generated, or the secure store may comprise a removable component of the computer system of the first party such as, for example, a removable smartcard, a flash drive, a floppy drive or any removable media or device that can be used to transport keys and/or related software that is insertable into a reader of or otherwise operative with the computer system. The removable component of the computer system of the first party should not be limited to the ones listed above.

Following the retrieving of the private key from the secure store in Step 1006, a public key is generated in Step 1008 as a deterministic function of the retrieved private key and the identified domain parameters; however, rather than using the generating point P of the domain parameters, as would be conventional in generating a public key from a private key in elliptic curve cryptography, the new generating point P' is substituted for this original generating point P of the domain parameters in Step 1008. After generating the public key in Step 1008, the public key is exported from the computer system in Step 1010 for communicating to another party that will be verifying digital signatures. The new generating point P' also is cleared in Step 1012.

In accordance with preferred method 1100, domain parameters DP for an elliptic curve used in elliptic curve cryptography are identified in Step 1102, including the identification of a generating point P. The generating point P is transformed in Step 404 into a new generating point P' using any of the several preferred methods for transforming the generating point P into the new generating point P' illustrated in FIGS. 15-18, discussed below.

Continuing with method 1100, a private key is determined in Step 1106 by generating the private key within the computer system of the first party as a deterministic function of user input data that is received within the computer system.

Figure 19:
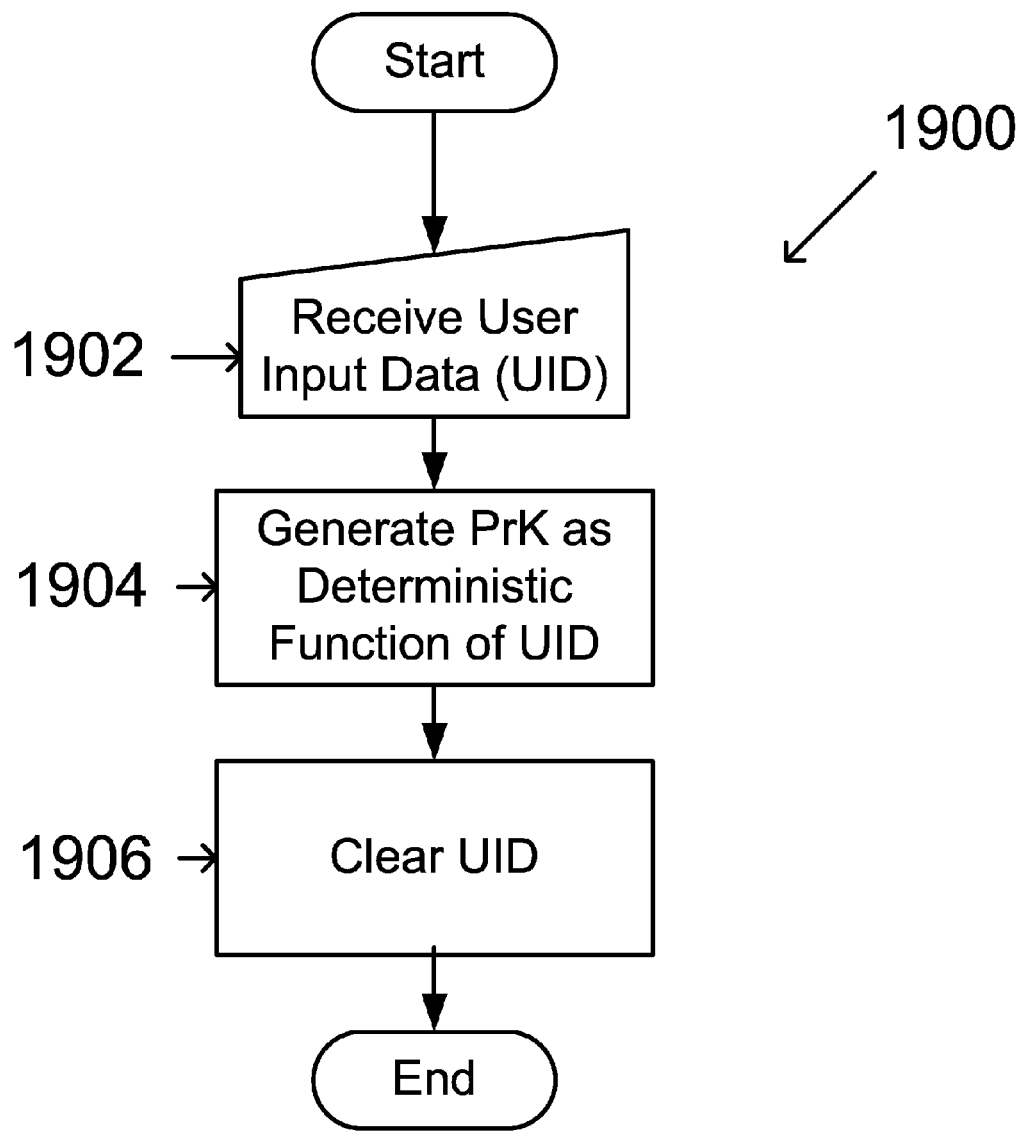
FIG. 19 illustrates a preferred method 1900 for generating a private key as a deterministic function of user input data in accordance with the invention.

The preferred method for generating the private key is illustrated in FIG. 19, discussed below.

Following the determining of the private key in Step 1106, a public key is generated in Step 1108 as a deterministic function of the retrieved private key and the identified domain parameters; however, rather than using the generating point P of the domain parameters, as would be conventional in generating a public key from a private key in elliptic curve cryptography, the new generating point P' is substituted for this original generating point P of the domain parameters in Step 1108. After generating the public key in Step 1108, the public key is exported from the computer system in step 1110 for communicating to another party that will be verifying digital signatures. The new generating point P' also is cleared in Step 1112.

Figure 12:
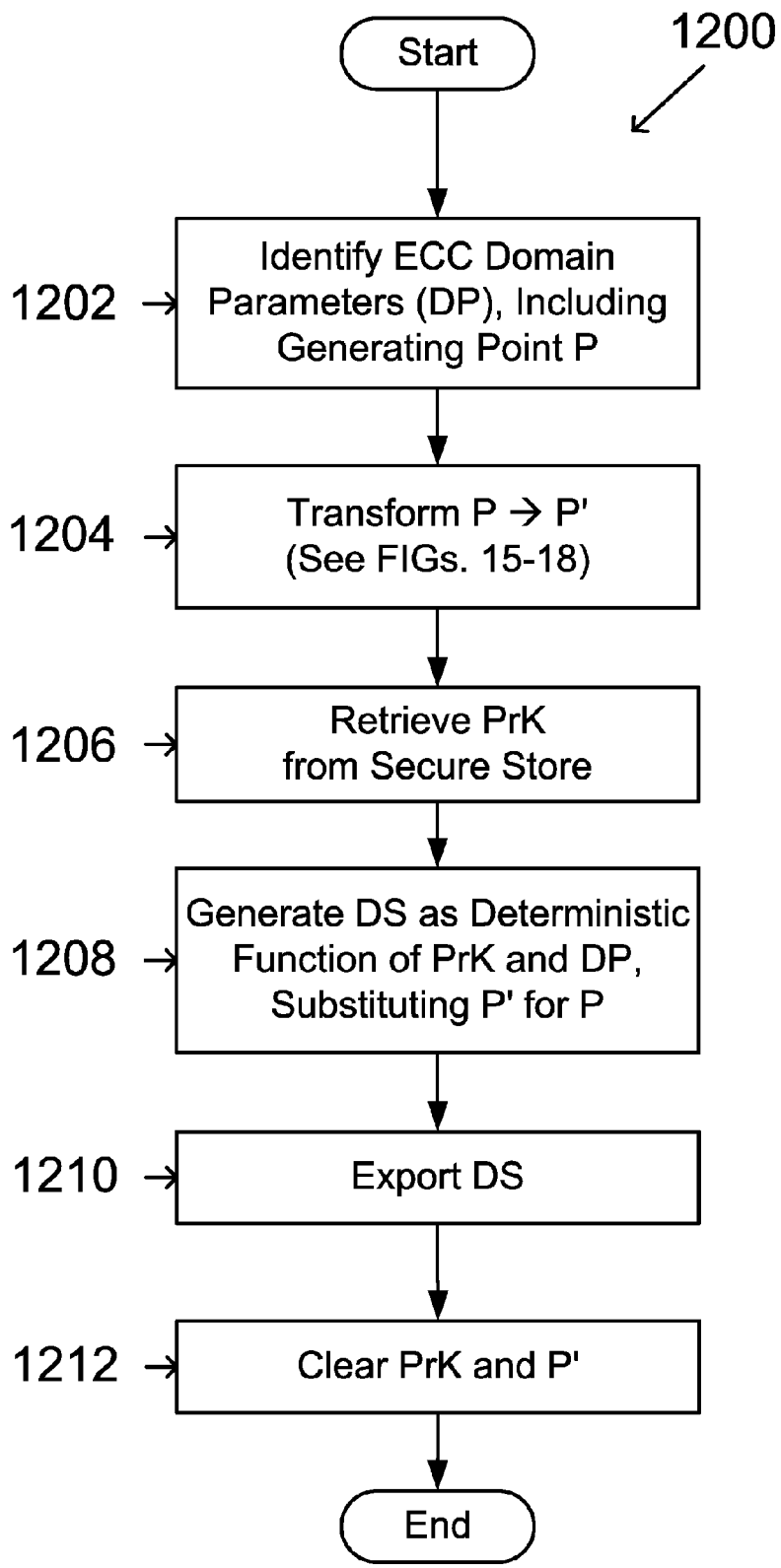
FIG. 12 illustrates in greater detail a preferred method 1200 for providing a digital signature in accordance with the invention.

Similar to the aforementioned preferred methods 1000, 1100 for providing public keys, methods 1200, 1300 for providing digital signatures by a first party in accordance with the invention are illustrated in FIG. 12 and FIG. 13, respectively, as described next.

In accordance with preferred method 1200, domain parameters DP for an elliptic curve used in elliptic curve cryptography are identified in Step 1202, including the identification of a generating point P. The generating point P is transformed in Step 1204 into a new generating point P'. As mentioned above, several exemplary methods exist for transforming the generating point P into the new generating point P', four of which methods are illustrated in FIGS. 15-18, discussed below. Any one of these methods may be utilized in Step 1204.

Continuing with method 1200, a private key is determined in Step 1206 by retrieving the private key from a secure store. Following the retrieving of the private key from the secure store in Step 1206, a digital signature for an electronic message is generated in Step 1208 as a function of the retrieved private key and the identified domain parameters; however, rather than using the generating point P of the domain parameters, as would be conventional in generating a digital signature from a private key in elliptic curve cryptography, the new generating point P' is substituted for the original generating point P of the domain parameters in Step 1208. After generating the digital signature in Step 1208, the digital signature is exported from the computer system in Step 1210 for communicating to another party that will be verifying digital signatures. The new generating point P' also is cleared in Step 1212. The comments above in connection with FIG. 9 relating to the use of a deterministic vs. a nondeterministic function in generating a digital signature are applicable here as well.

In accordance with preferred method 1300, domain parameters DP for an elliptic curve used in elliptic curve cryptography are identified in Step 1302, including the identification of a generating point P. The generating point P is transformed in Step 1304 into a new generating point P' using any of the several preferred methods for transforming the generating point P into the new generating point P' illustrated in FIGS. 15-18, discussed below.

Continuing with method 1300, a private key is determined in Step 1306 by generating the private key within the computer system as a deterministic function of user input data that is received within the computer system. Again, the preferred method for generating the private key is illustrated in FIG. 19, discussed below. Following the determining of the private key in Step 1306, a digital signature is generated in Step 1308 as a function of the retrieved private key and the identified domain parameters; however, rather than using the generating point P of the domain parameters, as would be conventional in generating a digital signature from a private key in elliptic curve cryptography, the new generating point P' is substituted for the original generating point P of the domain parameters in Step 1308. After generating the digital signature in Step 1308, the digital signature is exported from the computer system in step 1310 for communicating to another party that will be verifying digital signatures. The new generating point P' also is cleared in Step 1312. The comments above in connection with FIG. 9 relating to the use of a deterministic vs. a nondeterministic function in generating a digital signature are applicable here as well.

FIG. 14 illustrates a preferred method 1400 for verifying a digital signature and is performed by a party that receives both a public key and a digital signature that have been generated in accordance with the invention as discussed above. In Step 1402, domain parameters DP for an elliptic curve used in elliptic curve cryptography are identified and comprise the same domain parameters that were identified when the public key and the digital signature were generated. To this end, both the receiving party and the party generating the public key and the digital signature must know the domain parameters to be used.

Continuing with preferred method 1400, the receiving party transforms the generating point P in Step 1404 into a new generating point P' using any of the preferred methods for transforming the generating point P into the new generating point P' illustrated in FIGS. 15-18, discussed below. The receiving party then retrieves in Step 1406 a public key from a secure store, which public key preferably has been received from the first party. The receiving party then verifies (i.e., attempts to verify) in Step 1408 the digital signature as a function of the retrieved public key and the identified domain parameters; however, rather than using the generating point P of the domain parameters, as would be conventional in verifying the digital signature in elliptic curve cryptography, the new generating point P' is substituted for this original generating point P of the domain parameters in Step 1408. After verifying the digital signature in Step 1408, the public key and the new generating point P' are cleared from the computer system of the receiving party (but, of course, the public key does continue to be saved in the secure store of the receiving party for later verification of digital signatures). The comments above in connection with FIG. 9 relating to the use of a deterministic vs. a nondeterministic function in generating a digital signature are applicable here as well, as relating to verifying the digital signature.

FIG. 15, FIG. 16, FIG. 17, and FIG. 18 each illustrates a method for transforming a generating point P of identified domain parameters into a new generating point P'. In each described method, the generating point is transformed as a deterministic function of shared knowledge (sometimes abbreviated herein as "SK") that is known both to the party generating the public key and the digital signature, and to the party verifying the digital signature. Without both parties knowing the shared knowledge, the same new generating point could not be calculated and the party receiving the public key and the digital signature would be incapable of verifying the digital signature using the public key.

Figure 15:
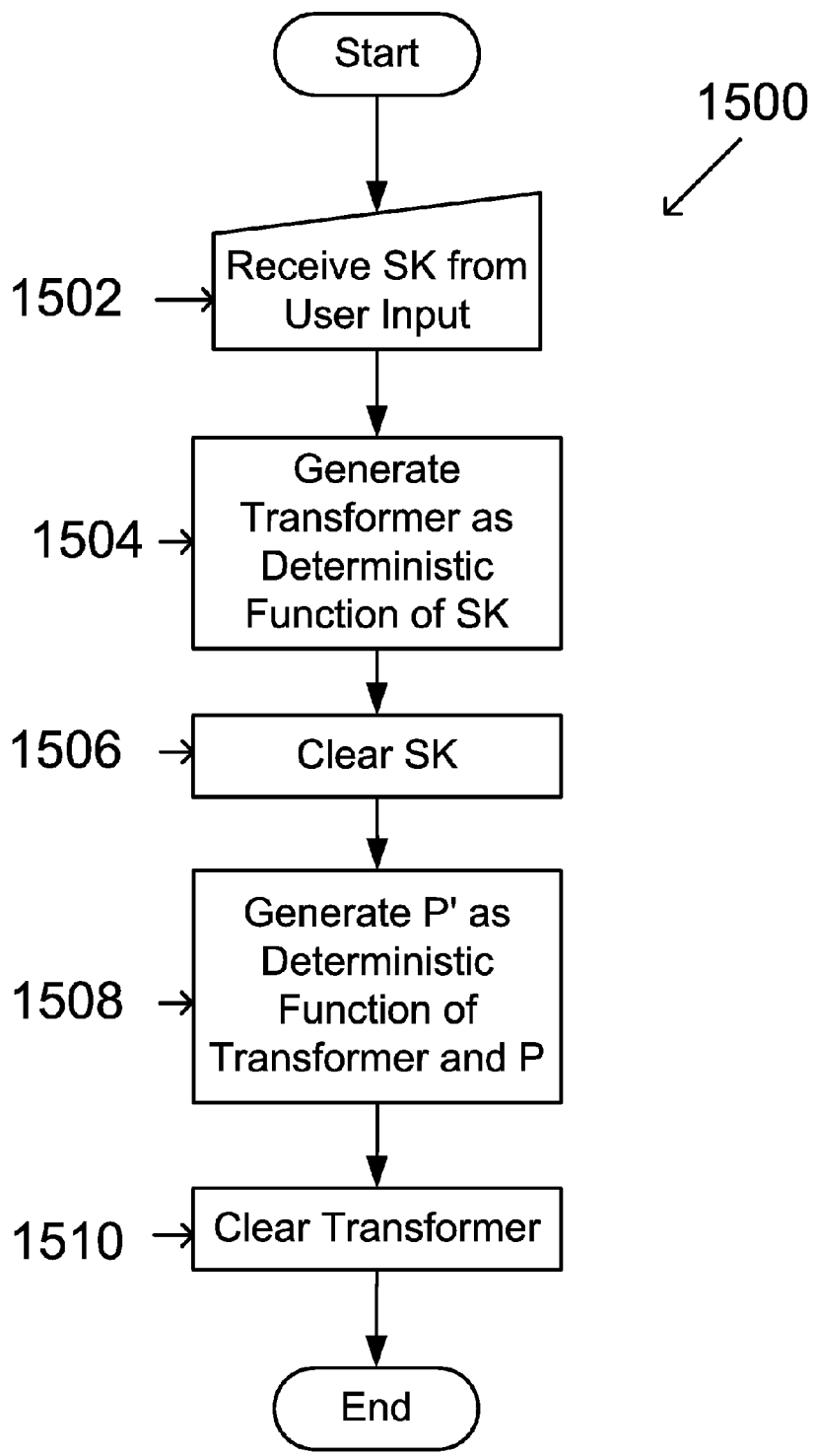
FIG. 15 illustrates a preferred method 1500 for transforming a generating point into a new generating point in accordance with the invention.

With particular regard to each of these four disclosed methods, FIG. 15 illustrates a first preferred method 1500 in which the shared knowledge is input into the computer system by a user, e.g., the first party. Preferably, the user who inputs the shared knowledge also represents the owner of the private key that is utilized to generate the public key and to generate digital signatures. Consequently, method 800 further preferably is performed by the first party that generates the public key and the digital signature, but not by the party that receives the public key and verifies digital signatures.

Accordingly, in method 1500, the shared knowledge is received from user input in Step 1502. In Step 1504, the shared knowledge is utilized to generate a transformer and, specifically, the transformer is generated as a deterministic function of the shared knowledge. The output of the deterministic function preferably is a large integer value, and any function that can deterministically generate a suitably large number from an input value can be used as the deterministic function to generate the transformer. The deterministic function itself may include such algorithms as hashing the shared knowledge; hashing multiple times the shared knowledge; and hashing multiple times the shared knowledge while folding interim hashes together. Moreover, any hashing algorithm used preferably is a strong hash function.

Thereafter, the shared knowledge is cleared in Step 1506 from the computer system, whereby the user input must be received yet again in order to generate the transformer. Furthermore, the transformer then is utilized in generating the new generating point P' in that the new generating point is generated in Step 1508 as a deterministic function of the transformer and the initial generating point P of the identified domain parameters. Moreover, the transformer is cleared in Step 1510 from the computer system following the transformation of the generating point P into the new generating point P', whereby the transformer must be generated again within the computer system in order to generate the new generating point.

Figure 16:
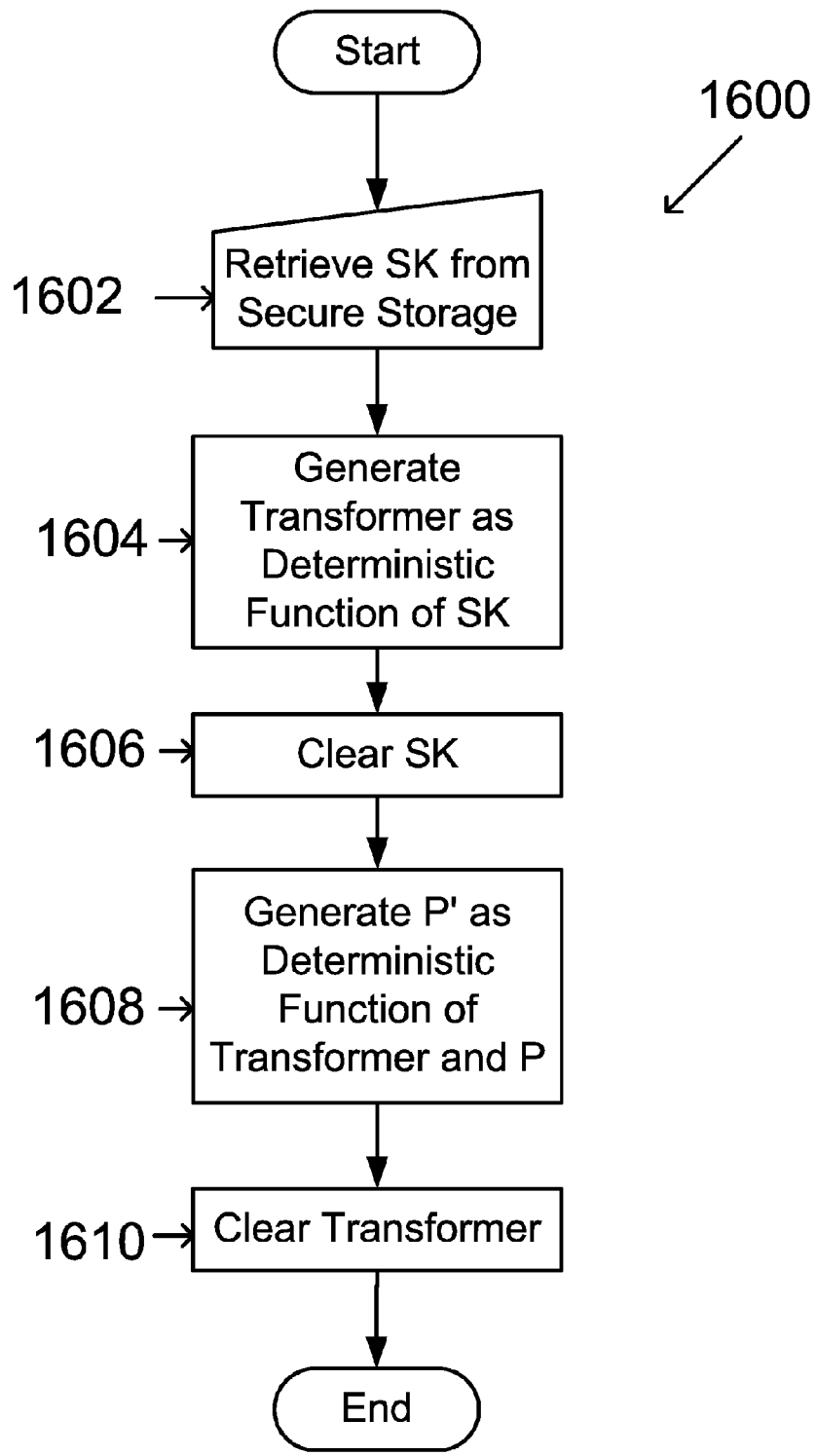
FIG. 16 illustrates an alternative preferred method 1600 for transforming a generating point into a new generating point in accordance with the invention.

FIG. 16 illustrates a second method 1600 in which the shared knowledge is retrieved in Step 1602 from a secure store of the computer system in which the generating point is transformed and the transformer is generated as a deterministic function of the shared knowledge in Step 1604. The output of the deterministic function preferably is a large integer value, and any function that can deterministically generate a suitably large number from an input value can be used as the deterministic function to generate the transformer. The deterministic function itself may include such algorithms as hashing the shared knowledge; hashing multiple times the shared knowledge; and hashing multiple times the shared knowledge while folding interim hashes together. Moreover, any hashing algorithm used preferably is a strong hash function.

Thereafter, the shared knowledge is cleared in Step 1606 from the computer system (but not from the secure store), whereby the shared knowledge must be retrieved yet again from the secure store in order to generate the transformer. The new generating point thereafter is generated in Step 1608 as a deterministic function of the transformer and the initial generating point P of the identified domain parameters. Moreover, the transformer is cleared in Step 1610 from the computer system following the transformation of the generating point P into the new generating point P', whereby the transformer must be generated again within the computer system in order to regenerate the new generating point.

Figure 17:
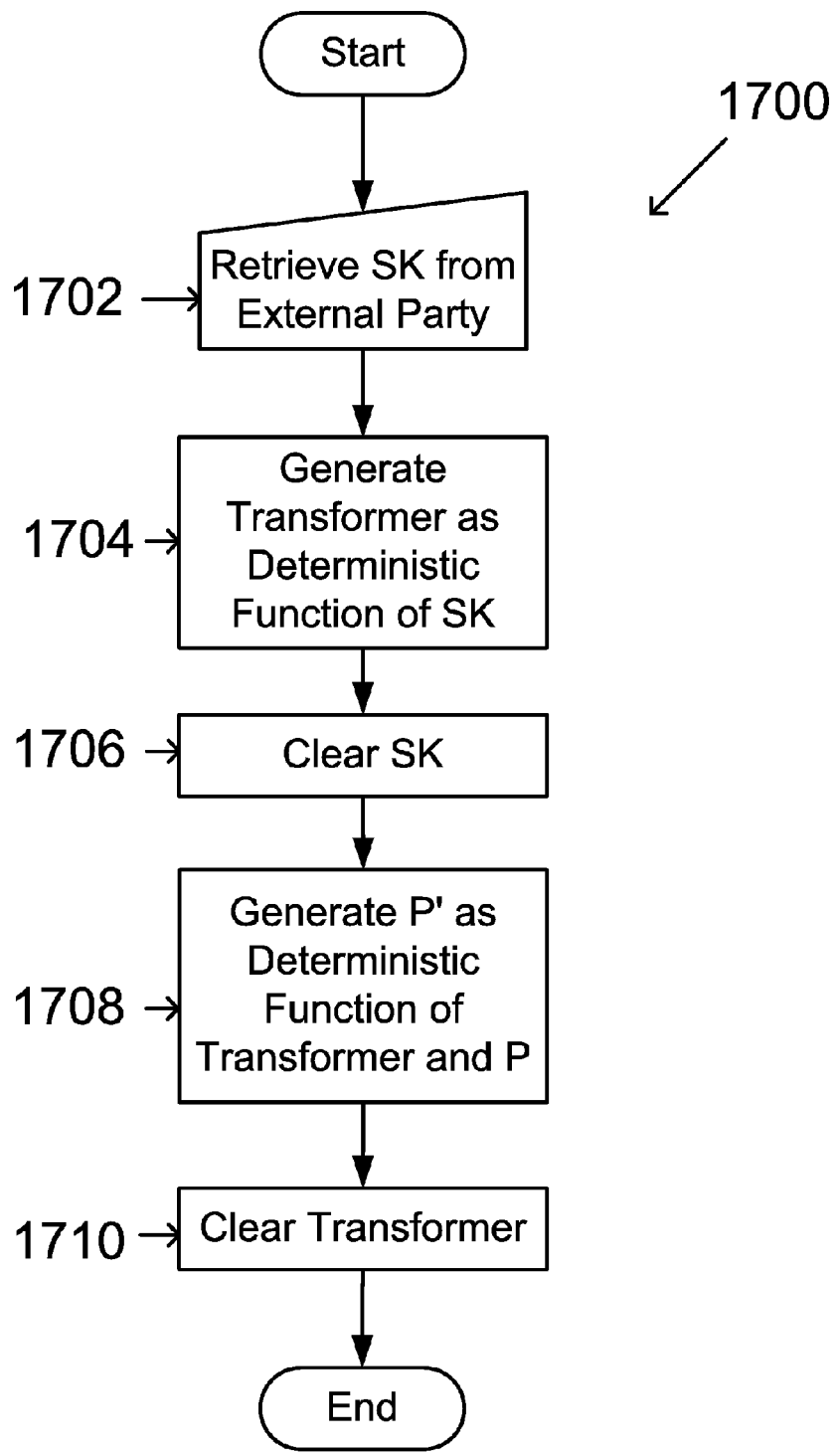
FIG. 17 illustrates another alternative preferred method 1700 for transforming a generating point into a new generating point in accordance with the invention.

FIG. 17 illustrates a third method 1700 in which the shared knowledge is retrieved in Step 1702 from a third party that is different from the first party that generates the public key and digital signatures, and that is different from the party that receives the public key and verifies the digital signatures. It is contemplated that the receiving party may comprise a service provider of one or more of the other parties for facilitating digital signature communications. In this regard, the receiving party may keep public keys of many different first parties and may provide a digital signature verification service to various third parties. In this scenario, the shared knowledge may comprise account information of the third party, which account information may be provided by the third party to each of the first party and the receiving party for independent calculation of the same transformer by each party.

In any event, the transformer then is generated as a deterministic function of the shared knowledge in Step 1704. The output of the deterministic function preferably is a large integer value, and any function that can deterministically generate a suitably large number from an input value can be used as the deterministic function to generate the transformer. The deterministic function itself may include such algorithms as hashing the shared knowledge; hashing multiple times the shared knowledge; and hashing multiple times the shared knowledge while folding interim hashes together. Moreover, any hashing algorithm used preferably is a strong hash function.

Thereafter, the shared knowledge is cleared in Step 1706 from the computer system, whereby the shared knowledge must be retrieved yet again from the third party in order to regenerate the transformer. Optionally, the shared knowledge may be saved in a secure store following its receipt from the third party. In such case, the preferred method 1600 of FIG. 16 may be utilized in subsequent transformations of the generating point P.

The new generating point thereafter is generated in Step 1708 as a deterministic function of the transformer and the initial generating point P of the identified domain parameters. Moreover, the transformer is cleared in Step 1710 from the computer system following the transformation of the generating point P into the new generating point P', whereby the transformer must be regenerated again within the computer system in order to regenerate the new generating point.

Figure 18:
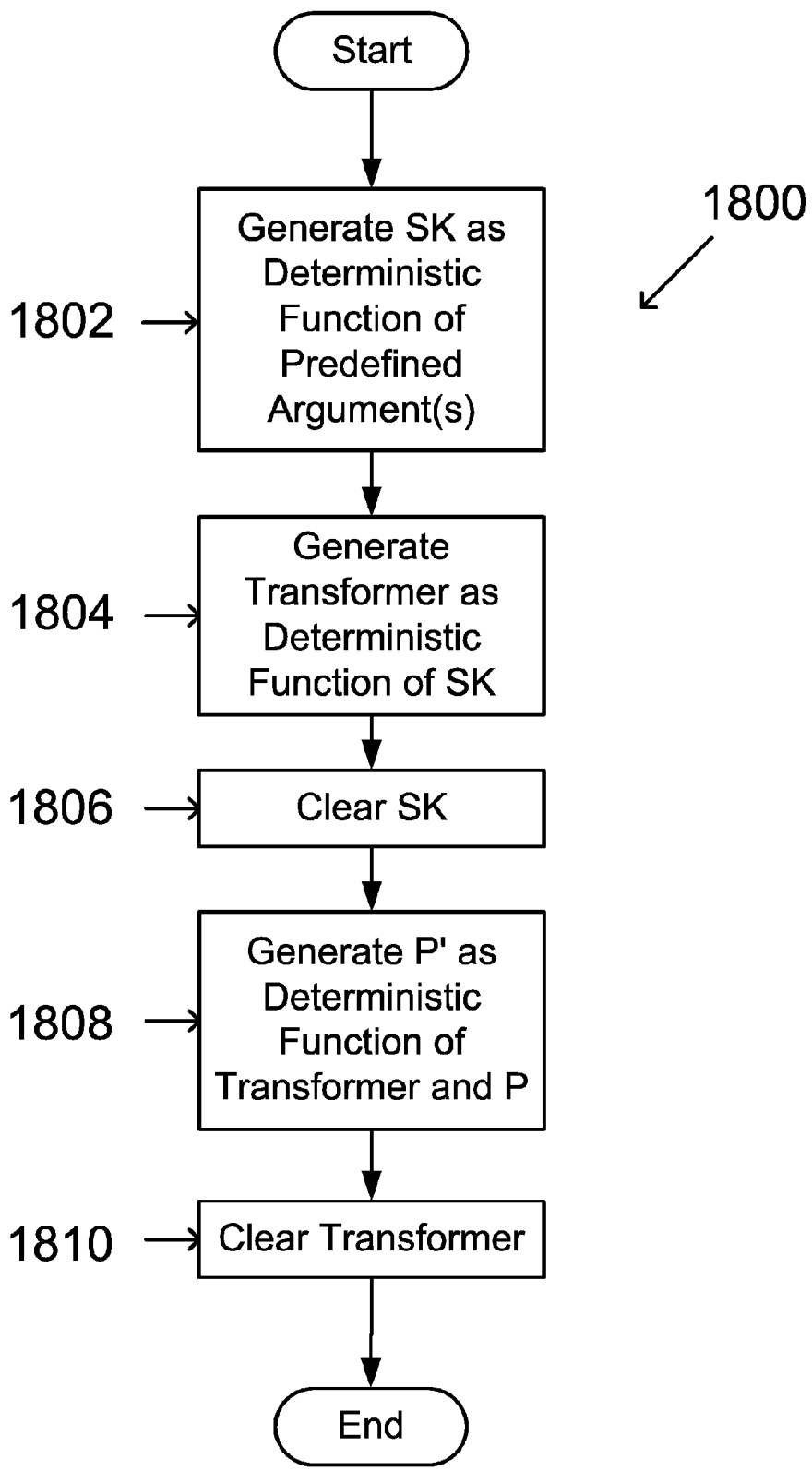
FIG. 18 illustrates a fourth alternative preferred method 1800 for transforming a generating point into a new generating point in accordance with the invention.

FIG. 18 illustrates the fourth method 1800, in which the shared knowledge itself is generated in Step 1802 from a deterministic function of one or more arguments that are predefined between the first party and the receiving party. As will be appreciated, by knowing the deterministic function and arguments to use, each party may independently generate the shared knowledge.

Step 1804, the transformer is generated as a deterministic function of the shared knowledge generated in Step 1802. The output of the deterministic function preferably is a large integer value, and any function that can deterministically generate a suitably large number from an input value can be used as the deterministic function to generate the transformer. The deterministic function itself may include such algorithms as hashing the shared knowledge; hashing multiple times the shared knowledge; and hashing multiple times the shared knowledge while folding interim hashes together. Moreover, any hashing algorithm used preferably is a strong hash function.

Thereafter, the shared knowledge generated in Step 1802 is cleared in Step 1806 from the computer system, whereby shared knowledge must be regenerated in order to generate the transformer. The new generating point P' thereafter is generated in Step 1808 as a deterministic function of the transformer and the initial generating point P of the identified domain parameters. Moreover, the transformer is cleared in Step 1810 from the computer system following the transformation of the generating point P into the new generating point P', whereby the transformer must be generated again within the computer system in order to regenerate the new generating point.

As will be appreciated, the deterministic function and predefined arguments used in Step 1802 should be protected as if such information itself were the shared knowledge, as the shared knowledge is directly derived from the deterministic function and the predefined arguments represents and is directly represented thereby. Furthermore, as will be appreciated, in accordance with method 1800, the shared knowledge may change over time and need not be static so long as the function used to calculate it is deterministic, and so long as the parties know to use the same arguments (values) each time that the shared knowledge is to be calculated.

FIG. 19 illustrates three steps of a method 1900 for providing a private key in accordance with the invention. The method 1900 is performed in a computer system such as, for example, any one of a desktop computer; a laptop computer; a personal digital assistant (PDA); and a telephonic device.

This method includes Step 1902 of receiving into the computer system user input data; Step 1904 of generating within the computer system a private key as a deterministic function of the received UID; and, following generation of the private key, Step 1906 of clearing from the computer system the received UID so that the UID is no longer available within the computer system for regenerating the private key within the computer system. In this respect, the UID preferably is cleared in Step 1906 so that the UID must be received again within the computer system in order to regenerate the private key within the computer system using the same deterministic function of Step 1904. Furthermore, the private key generated in Step 1904 is utilized in a cryptographic operation but, preferably, is not exported from the computer system in which it is generated.

The UID received in Step 1902 may be something that is known by the user or something that is generally unique to the user, such as a biometric, or both. If the UID is to comprise something that is known by the user, then the UID preferably comprises any one of a PIN, password, and passphrase. If the UID is to comprise something that is generally unique to the user, then the UID preferably comprises a physical or behavioral biometric. Examples of physical biometrics include: facial characteristics; hand geometry; fingerprints; thumbprints; ocular characteristics, such as of the retina or iris; vascular patterns; and DNA patterns. Examples of behavioral characteristics include: vocal behavior; signature dynamics; and keystroke dynamics.

Step 1906 of clearing the received UID preferably includes overwriting the UID wherever it is stored or saved in memory of the computer system. The overwriting preferably includes wiping or writing pseudo random bit strings to the data blocks of the computer memory in which the UID is saved or stored. (Of course, the step of clearing does not necessarily include clearing from a secure store.)

In a feature of this method 1900, the clearing of the UID is performed immediately upon the generating of the private key in Step 1904. In this case, the UID is only temporarily stored within the computer system (e.g., cached in RAM or in a paging file) for a very short period, and it is extremely transient in nature. The transient nature of the UID reduces the risk that the UID may be copied or otherwise compromised by another who would then utilize the UID in regenerating the private key for use without authorization (assuming such person also was able to compromise the transformer).

In an alternative feature of this method 1900, the clearing of the UID is not performed immediately upon the generating of the private key in Step 1904 but, instead, it cleared within a short, predetermined period of time, i.e., when a short, predetermined period of time has expired. In this case, the UID is temporarily stored within the computer system for the short, predetermined period of time, whereby the cryptographic key can be regenerated using the stored UID during this short, predetermined period of time, as needed. While this does increases to some extent the risk of compromise of the UID, the temporary retention of the UID for regenerating of the cryptographic key during this short, predetermined period of time may provide an appreciable convenience to the authorized user. For example, with this feature, the authorized user can continue to regenerate and use the cryptographic key in other cryptographic operations during this short, predetermined period of time without the UID having to be received again within the computer system. The short, predetermined period of time after which the UID may be cleared may be a predetermined fixed amount of time. Alternatively, or in addition thereto, this period of time may be defined by a beginning event and ending event.

The deterministic function of Step 1904 of method 1900 outputs a value using the UID as an argument of the function. This value represents the private key. The function is "deterministic" because each time the same UID is used as an argument of the function, the same output is received. In the preferred embodiment, the output of the deterministic function in step 1204 preferably is a large integer value. Furthermore, any function that can deterministically generate a suitably large number from an input value can be used as the deterministic function of step 1904 to generate the private key, as a private key for use in ECC is fundamentally any suitably large number. The deterministic function itself may include such algorithms as hashing the UID; hashing multiple times the UID; and hashing multiple times the UID while folding interim hashes together. Moreover, any hashing algorithm used preferably is a strong hash function. As will be appreciated by one having ordinary skill in the art, a strong hash function is a hashing algorithm that is considered secure because it: 1) it is computationally infeasible to find UID that corresponds to a given message digest; and, 2) it is computationally infeasible to find two UIDs that produce the same message digest. Using a strong hash function, any change to the UID will, with a very high probability, result in a different message digest.

As will be appreciated from the foregoing, method 1900 safeguards the private key by not storing or saving the private key within a computer system for any extended or indefinite period of time. Instead, the private key is ephemeral and generated from time-to-time, as needed, based on input data from a user. Because the private key is not stored or saved for an extended or indefinite period of time within the computer system, the private key is less susceptible to compromise compared to a system in which a private key is stored for an extended or indefinite period of time within the computer system. Preferably, the private key is destroyed after each use and must be regenerated again each time the private key is required for a cryptographic operation or function such as, for example, generating a public key or generating a digital signature.

Figure 20:
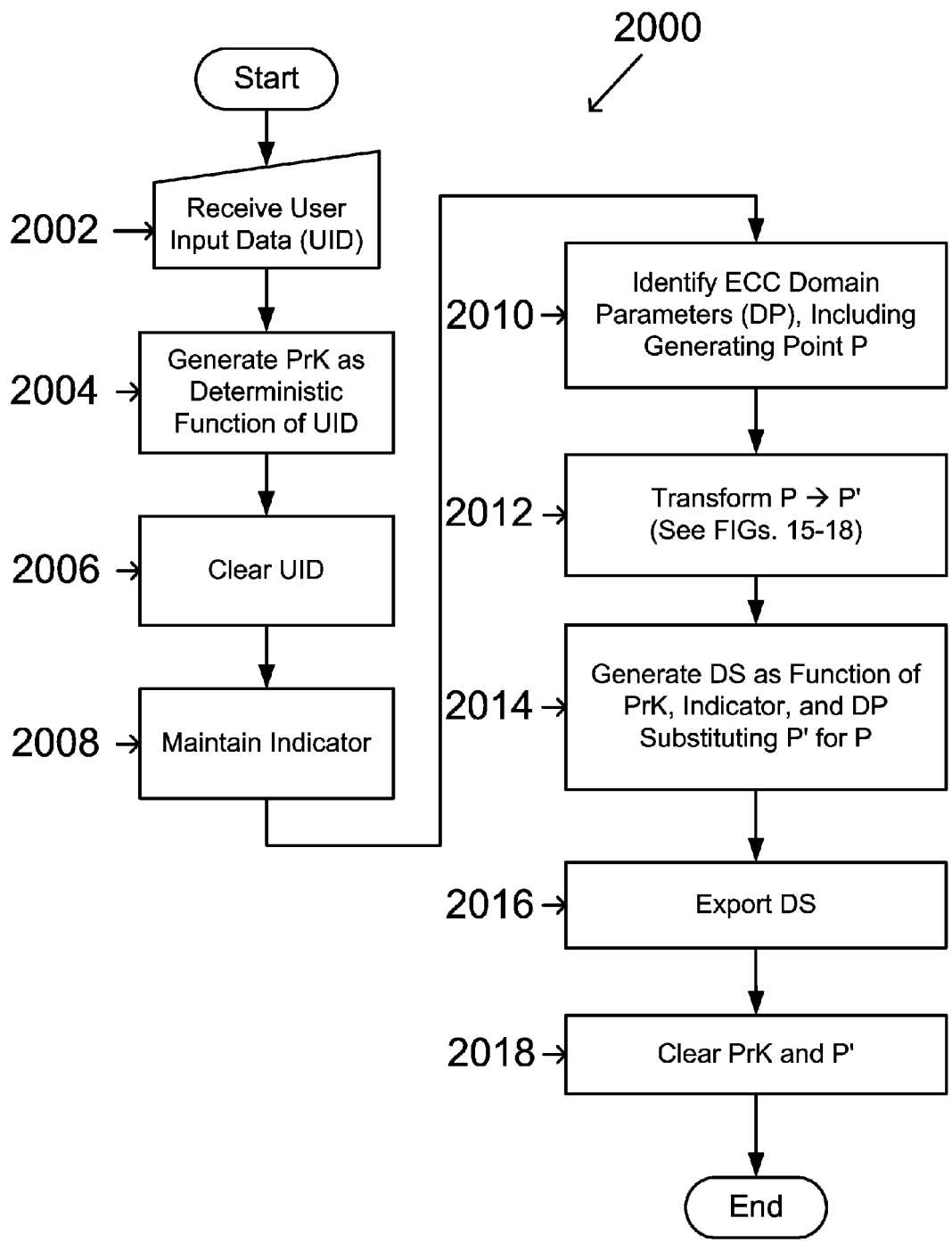
FIG. 20 illustrates another preferred method 2000 for providing digital signatures in accordance with the invention.

FIG. 20 illustrates yet another method 2000 for providing a digital signature in accordance with the invention. This method 2000 incorporates the aforementioned method 1900 for providing a private key, in that the UID is received in Step 2002; the private key is generated in Step 2004 as a deterministic function of the UID; and the UID then is cleared from the computer system following the generation of the private key in Step 2006 so that the UID must be received again within the computer system in order to regenerate the private key.

Method 2000 further includes identifying in Step 2010 domain parameters for an elliptic curve used in elliptic curve cryptography; transforming in Step 2012 the identified generating point P utilizing one of the four preferred methods of FIGS. 15-18; generating a digital signature in Step 2014 as a function of the private key and identified domain parameters, in which the generating point P is replaced with the new generating point P'; exporting the digital signature in Step 2016; and, thereafter, clearing the private key and the new generating point from the computer system. The comments above in connection with FIG. 9 relating to the use of a deterministic vs. a nondeterministic function in generating a digital signature are applicable here as well.

Additionally, method 2000 includes in Step 2008 maintaining an indicator, and the generation of the digital signature further includes the indicator as another argument of the function in Step 2014. The indicator that is maintained preferably indicates whether a digital signature has yet been generated in Step 2014 since the last receipt of the UID in Step 2002 and/or whether a digital signature has yet been generated in Step 2014 since the last generation of the private key in Step 2004. Additionally, or alternatively, the indicator that is maintained may indicate whether a digital signature has yet been generated in Step 2014 since the last transformation of a generating point in Step 2012.

The function for generating the digital signature preferably includes appending the indicator to that which is digitally signed such as, for example, an electronic message. The indicator may comprise, for example, either a "1" or "0" appended to the beginning or end of the electronic message. Of course, the indicator also should be communicated to the recipient of that which was digitally signed in order for the recipient to be able to verify the digital signature; however, the indicator need not be communicated if the recipient is aware of the possible values of the indicator and, therefore, can verify the digital signature by checking all possibilities. For example, the recipient of the electronic message and digital signature for the message—which in this case is the digital signature of both the message and the indicator appended thereto—can append the known different possible values of the indicator to the electronic message in verifying the digital signature. One of the different possibilities should result in verification of the digital signature, provided that the message was not changed in transit and that the true private key was used in generating the digital signature.

Additional information regarding transmission of an indicator and, in particular, an indicator of verification status, is disclosed in U.S. patent application publication no. 2004/0005051 A1, which application publication is incorporated herein by reference. The maintenance of an indicator is particularly useful when multiple digital signatures may be generated within a predefined period of time after generation of the private key, because a particular transaction may require that the digital signature be the first digital signature generated so as to reduce the chances that a digital signature was generated without authorization.

What is claimed is:

1. A method of providing a digital signature of a first party using a private key of a public-private key pair in the elliptic curve digital signature algorithm (ECDSA), the method comprising:
   (a) identifying domain parameters of an elliptic curve for use in elliptic curve cryptography, the domain parameters including an initial generating point;
   (b) transforming within a computer system the initial generating point into a new generating point as a deterministic function of shared knowledge, wherein the shared knowledge is known to the first party and a second party different from the first party; and
   (c) generating within the computer system a digital signature as a function of a private key and the domain parameters, in which the new generating point is substituted for the initial generating point.

2. The method of claim 1, further comprising clearing from the computer system the new generating point following said generating the digital signature so that the generating point is no longer available within the computer system for regenerating the digital signature.

3. The method of claim 1, wherein the deterministic function of the shared knowledge outputs a large integer value.

4. The method of claim 1, wherein transforming the initial generating point into a new generating point further includes multiplying the initial generating point by the transformer to arrive at the new generating point.

5. The method of claim 1, wherein the shared knowledge comprises an account number for an account of the first party that is maintained with the second party.

6. The method of claim 1, further comprising receiving user input into the computer system from the first party, the user input comprising the shared knowledge.

7. The method of claim 1, wherein the shared knowledge comprises information that is communicated between the first party and the second party.

8. The method of claim 1, wherein the shared knowledge comprises information that is communicated by a third party both to the first party and the second party.

9. The method of claim 1, wherein the shared knowledge comprises a unique identifier of the first party to the second party.

10. The method of claim 1, wherein the shared knowledge comprises a deterministic function of one or more predefined arguments, wherein the deterministic function and predefined arguments are known both to the first party and the second party, whereby both the first party and the second party may independently calculate the shared knowledge for use in generating the transformer.

11. The method of claim 1, further comprising exporting said generated digital signature from the computer system for communicating to the second party.

12. The method of claim 1, wherein identifying the domain parameters of an elliptic curve comprises receiving an identification of the domain parameters from the second party.

13. The method of claim 1, wherein identifying the domain parameters of an elliptic curve comprises selecting the domain parameters by the first party, and wherein the method further comprises communicating by the first party said selected domain parameters to the second party.

14. The method of claim 1, further comprising determining the private key.

15. The method of claim 14, wherein determining the private key comprises generating the private key as a deterministic function of user input data that is received within the computer system from the first party.

16. The method of claim 15, wherein the user input data represents a passphrase, password, or PIN.

17. The method of claim 15, wherein the user input data represents a biometric characteristic.

18. The method of claim 15, further comprising clearing the private key from the computer system following said step of generating the digital signature so that the private key must be regenerated within the computer system in order to generate a digital signature within the computer system using the function of said step (c).

19. The method of claim 15, further comprising clearing the user input data from the computer system following generating the private key so that the user input data must be received again within the computer system in order to regenerate the private key within the computer system.

20. The method of claim 14, wherein determining the private key comprises retrieving the private key from a secure store of the computer system.

21. A computer-readable medium having computer-executable instructions for performing the steps comprising:
   (a) identifying domain parameters of an elliptic curve for use in elliptic curve cryptography, the domain parameters including an initial generating point;
   (b) transforming within a computer system the initial generating point into a new generating point as a deterministic function of shared knowledge, wherein the shared knowledge is known to a first party and a second party different from the first party; and
   (c) generating within the computer system a digital signature as a function of a private key and the domain parameters, in which the new generating point is substituted for the initial generating point.

22. In a method of providing a digital signature with a private key of a public-private key pair of a first party using the elliptic curve digital signature algorithm (ECDSA), the method including generating a digital signature as a function of the private key and domain parameters of an elliptic curve, the domain parameters including a generating point, an improvement to the method comprising,
   (a) calculating a larger integer value as a deterministic function of shared knowledge that is known to the first party and a second party different from the first party,
   (b) multiplying the generating point of the domain parameters by said calculated integer value to obtain a new generating point, and
   (c) replacing the generating point of the domain parameters with the new generating point during generating the digital signature as a function of the private key and the domain parameters.

23. A method of providing two digital signatures in accordance with the elliptic curve digital signature algorithm (ECDSA), and using the same private key of a first party, which digital signatures can be verified with different respective public keys, the method comprising,
   (a) with respect to the first digital signature,
      (i) identifying domain parameters of an elliptic curve for use in elliptic curve cryptography, the domain parameters including an initial generating point,
      (ii) transforming in a deterministic function of shared knowledge within a computer system the initial generating point into a first new generating point, wherein the shared knowledge is known to the first party and a second party different from the first party, and
      (iii) generating within the computer system the first digital signature as a function of the private key and the domain parameters, in which the first new generating point is substituted for the initial generating point; and
   (b) with respect to the second digital signature,
      (i) transforming in a deterministic function of shared knowledge within the computer system the initial generating point of the domain parameters into a second new generating point, wherein the shared knowledge is known to the first party and a third party different from the first party and
      (ii) generating within the computer system the second digital signature as a function of the same private key and the domain parameters, in which the second new generating point is substituted for the initial generating point.

24. The method of claim 23, wherein the different respective public keys are provided by,
   generating the first public key as a deterministic function of the private key and the domain parameters, in which the first new generating point of (a)(ii) is substituted for the initial generating point, said generated first public key thereby comprising, in conjunction with the private key, the first public-private key pair for use in elliptic curve cryptography; and
   generating the second public key as a deterministic function of the private key and the domain parameters, in which the second new generating of (b)(i) point is substituted for the initial generating point, said generated second public key thereby comprising, in conjunction with the private key, the second public-private key pair for use in elliptic curve cryptography.

25. A method of providing by a first party a public key of a public-private key pair for use in elliptic curve cryptography, the method comprising:
   (a) identifying domain parameters of an elliptic curve for use in elliptic curve cryptography, the domain parameters including an initial generating point;
   (b) transforming within a computer system the initial generating point into a new generating point as a deterministic function; and
   (c) generating within computer system a public key as a deterministic function of a private key and the domain parameters, in which the new generating point is substituted for the initial generating point;
   (d) wherein said generated public key comprises, in conjunction with the private key, a public-private key pair for use in elliptic curve cryptography.

26. The method of claim 25, further comprising clearing from the computer system the new generating point following said step of generating the public key so that the generating point is no longer available within the computer system for regenerating the public key.

27. A computer-readable medium having computer-executable instructions for performing the steps comprising:
   (a) identifying domain parameters of an elliptic curve for use in elliptic curve cryptography, the domain parameters including an initial generating point;
   (b) transforming within a computer system the initial generating point into a new generating point as a deterministic function; and
   (c) generating within the computer system a public key as a deterministic function of a private key and the domain parameters, in which the new generating point is substituted for the initial generating point;
   (d) wherein said generated public key comprises, in conjunction with the private key, a public-private key pair for use in elliptic curve cryptography.

28. In a method of providing a public key of a public-private key pair of a first party for use in elliptic curve cryptography, the method including generating a public key as a deterministic function of a private key and domain parameters of an elliptic curve for use in elliptic curve cryptography, the domain parameters including a generating point, wherein said generated public key comprises, in conjunction with the private key, a public-private key pair for use in elliptic curve cryptography, an improvement to the method comprising,
   (a) calculating within a computer system a large integer value as a deterministic function of shared knowledge that is known to the first party and a second party different from the first party,
   (b) multiplying the generating point of the domain parameters by said calculated integer value to obtain a new generating point, and
   (c) replacing the generating point of the domain parameters with the new generating point during generating the public key as a deterministic function of the private key and the domain parameters.

* * * * *

UNITED STATES PATENT AND TRADEMARK OFFICE
CERTIFICATE OF CORRECTION

PATENT NO. : 7,593,527 B2  Page 1 of 1
APPLICATION NO. : 11/161556
DATED : September 22, 2009
INVENTOR(S) : Curtis Linn Beeson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1080 days.

Signed and Sealed this

Twenty-first Day of September, 2010

David J. Kappos
*Director of the United States Patent and Trademark Office*